US012673301B2

(12) United States Patent
Xiao

(10) Patent No.: US 12,673,301 B2
(45) Date of Patent: Jul. 7, 2026

(54) MULTILAYER POROUS MEMBRANE WITH INCOMPATIBLE RESINS

(71) Applicant: Celgard, LLC, Charlotte, NC (US)

(72) Inventor: Kang Karen Xiao, Mississauga (CA)

( * ) Notice: Subject to any disclaimer, the term of this patent is extended or adjusted under 35 U.S.C. 154(b) by 508 days.

(21) Appl. No.: 17/920,792

(22) PCT Filed: Apr. 22, 2021

(86) PCT No.: PCT/US2021/028659
§ 371 (c)(1),
(2) Date: Oct. 23, 2022

(87) PCT Pub. No.: WO2021/216884
PCT Pub. Date: Oct. 28, 2021

(65) Prior Publication Data

US 2024/0198296 A1 Jun. 20, 2024

Related U.S. Application Data

(60) Provisional application No. 63/014,876, filed on Apr. 24, 2020.

(51) Int. Cl.
*B01D 71/26* (2006.01)
*B01D 69/14* (2006.01)
(Continued)

(52) U.S. Cl.
CPC ......... *B01D 71/261* (2022.08); *B01D 69/141* (2013.01); *H01M 10/052* (2013.01); *H01M 50/417* (2021.01); *H01M 50/449* (2021.01)

(58) Field of Classification Search
None
See application file for complete search history.

(56) References Cited

U.S. PATENT DOCUMENTS 5,691,077 A 11/1997 Yu
8,778,525 B2 7/2014 Kikuchi et al.
(Continued)

FOREIGN PATENT DOCUMENTS

EP 3182850 B1 9/2018
JP H08212995 A 8/1996
(Continued)

OTHER PUBLICATIONS

PCT Search Report dated Aug. 12, 2021, from PCT counterpart Application No. PCT/US 2021/028659.
(Continued)

*Primary Examiner* — Krishnan S Menon
(74) *Attorney, Agent, or Firm* — J. Clinton Wimbish; Maynard Nexsen, PC

(57) ABSTRACT

A monolayer, bilayer, trilayer, or multilayer porous membrane having at least one layer that contains a thermoplastic resin and a polymer that is incompatible with the thermoplastic resin. One structure is a multilayer porous membrane where at least one internal layer of the multilayer porous membrane contains the thermoplastic resin and the polymer that is incompatible with the thermoplastic resin. Higher amounts of incompatible polymer may be used in an internal layer. This structure has improved properties, including improved puncture strength. Another structure includes at least one layer containing polyethylene and a polymer that is incompatible with polyethylene. The at least one layer containing polyethylene and a polymer that is incompatible with polyethylene may be an internal layer or an external layer. An internal layer may include more incompatible polymer than an external layer. The porous membranes may be used as battery separators. For example, they may be used as battery separators in secondary batteries such as lithium ion secondary batteries.

28 Claims, 7 Drawing Sheets

(51) Int. Cl.

| | |
|---|---|
| ***H01M 10/052*** | (2010.01) |
| ***H01M 50/417*** | (2021.01) |
| ***H01M 50/449*** | (2021.01) |

(56) References Cited

U.S. PATENT DOCUMENTS

| | | | |
|---|---|---|---|
| 2006/0141351 | A1 | 6/2006 | Suh |
| 2009/0148761 | A1 | 6/2009 | Kikuchi et al. |
| 2009/0208842 | A1 | 8/2009 | Harada et al. |
| 2009/0211581 | A1 | 8/2009 | Bansal |
| 2013/0344375 | A1 | 12/2013 | Brant et al. |
| 2017/0274228 | A1 | 9/2017 | Nguyen et al. |
| 2018/0179341 | A1 | 6/2018 | Miyazawa |

FOREIGN PATENT DOCUMENTS

| | | | |
|---|---|---|---|
| JP | 2006-179485 | A | 7/2006 |
| JP | 4234392 | B2 | 3/2009 |
| JP | 2018-001450 | A | 1/2018 |
| JP | 2021-504874 | A | 2/2021 |
| KR | 10-2005-0079897 | A | 8/2005 |
| WO | 2007/023918 | A1 | 3/2007 |
| WO | 2012/096248 | A1 | 7/2012 |
| WO | 2013/054929 | A1 | 4/2013 |
| WO | WO2016028553 | | 2/2016 |
| WO | 2017/057109 | A1 | 4/2017 |
| WO | WO/2018/089748 | | 5/2018 |
| WO | 2019/103947 | A2 | 5/2019 |

OTHER PUBLICATIONS

PCT Written Report dated Aug. 12, 2021, from PCT counterpart Application No. PCT/US 2021/028659.

PCT IPRP dated Oct. 25, 2022, from PCT counterpart Application No. PCT/US 2021/028659.

First office action received for Chinese Patent Application No. 202180044000.X, mailed on Oct. 30, 2024, 18 pages including English translation.

Second office action received for Chinese Patent Application No. 202180044000.X, mailed on May 10, 2025, 17 pages including English translation.

Extended European Search Report received for European Patent Application No. 21792068.5, mailed on Apr. 2, 2025, 10 pages.

Search Report received for Japanese Patent Application No. 2022-564125, mailed on Jan. 16, 2025, 40 pages including English translation.

Office Action received for Japanese Patent Application No. 2022-564125, mailed on Mar. 4, 2025, 13 pages including English translation.

Decision to grant received for Japanese Patent Application No. 2022-564125, mailed on Sep. 2, 2025, 05 pages including English translation.

Office Action received for Korean Patent Application No. 10-2022-7040310, mailed on Jul. 16, 2025, 10 pages 7 including English translation.

Lamination
interface

Coextruded trilayer having a
structure PE/PE/PE

Coextruded trilayer having
structure PP/PP/PP where one
or more of the internal or
external PP layers contains an
incompatible polymer, e.g., a
block copolymer such as a
styrenic block copolymer

MULTILAYER POROUS MEMBRANE WITH INCOMPATIBLE RESINS

CROSS-REFERENCE TO RELATED APPLICATIONS

This application is a 371 application to PCT Application No. PCT/US2021/028659, filed Apr. 22, 2021, which claims priority to U.S. Provisional Application No. 63/014,876, filed Apr. 24, 2020, which is incorporated herein by reference in its entirety.

FIELD OF THE INVENTION

In accordance with at least selected embodiments, the application, disclosure or invention relates to membranes, separator membranes, separators, battery separators, secondary lithium battery separators, multilayer membranes, multilayer separator membranes, multilayer separators, multilayer battery separators, multilayer secondary lithium battery separators, multilayer battery separators, batteries, capacitors, fuel cells, lithium batteries, lithium ion batteries, secondary lithium batteries, and/or secondary lithium ion batteries, and/or methods for making and/or using such membranes, separator membranes, separators, battery separators, secondary lithium battery separators, batteries, capacitors, fuel cells, lithium batteries, lithium ion batteries, secondary lithium batteries, textiles, filters, HVAC, materials for personal protective equipment, and/or secondary lithium ion batteries, and/or devices, vehicles or products including the same, and/or methods for making, testing, quantifying, characterizing, and/or analyzing such membranes, separator membranes, separators, battery separators, and the like. In accordance with at least certain embodiments, the disclosure or invention relates to membrane layers, membranes or separator membranes, battery separators including such membranes, and/or related methods. In accordance with at least certain selected embodiments, the disclosure or invention relates to porous polymer membranes or separator membranes, battery separators including such membranes, and/or related methods. In accordance with at least particular embodiments, the disclosure or invention relates to microporous polyolefin membranes or separator membranes, microlayer membranes, multi-layer membranes including one or more microlayer or nanolayer membranes, battery separators including such membranes, and/or related methods. In accordance with at least certain particular embodiments, the disclosure or invention relates to microporous polymer membranes or separator membranes having one or more exterior layers and/or interior layers, microlayer membranes, multi-layered microporous membranes or separator membranes having exterior layers and interior layers, some of which layers or sublayers are created by co-extrusion and then laminated together to form the membranes or separator membranes. In some embodiments, certain layers, microlayers or nanolayers can comprise a homopolymer, a copolymer, block copolymer, elastomer, and/or a polymer blend. In select embodiments, at least certain layers, microlayers or nanolayers can comprise a different or distinct polymer, homopolymer, copolymer, block copolymer, elastomer, and/or polymer blend. In select embodiments, at least certain layers, microlayers, or nanolayers have a thermoplastic resin and a first polymer that is incompatible with the thermoplastic resin. The disclosure or invention also relates to methods for making such a membrane, separator membrane, or separator, and/or methods for using such a membrane, separator membrane or separator, for example as a lithium battery separator. In accordance with at least selected embodiments, the application or invention is directed to multi-layered and/or microlayer porous or microporous membranes, separator membranes, separators, composites, electrochemical devices, and/or batteries, and/or methods of making and/or using such membranes, separators, composites, devices and/or batteries. In accordance with at least particular selected embodiments, the application or invention is directed to separator membranes that are multi-layered, in which one or more layers of the multi-layered structure is produced in a multi-layer or microlayer co-extrusion die with multiple extruders. The membranes, separator membranes, or separators can demonstrate improved puncture strength, improved shutdown, improved strength, improved dielectric breakdown strength, and/or reduced tendency to split.

BACKGROUND

Batteries, such as lithium ion batteries, may incorporate multilayer separator membranes to separate electrodes, retain electrolyte, enhance charge transfer, and other roles.

One separator membrane design is a trilayer polyolefin-based separator. These trilayer designs have traditionally been effective in traditional lithium batteries, but there is a constant desire to improve the fully optimize a balance of strength and/or performance properties for use in newer applications of certain primary and/or secondary batteries, such as lithium ion rechargeable batteries. This is especially true as the battery separator requirements are becoming more demanding as customers want thinner and stronger battery separators. For example, a microporous trilayer membrane formed by coextruding the three layers can in some instances have reduced strength when made at thinner specifications than traditional separators. Separators formed by laminating monolayers can also in some instances fail to satisfy the ever-increasing demands of thinner and stronger separators in new applications.

Hence, there is a need for a new and improved multi-layered microporous membranes, base films, or battery separators having various improvements over prior membranes, base films, or battery separators.

SUMMARY

Applicants solve some of the deficiencies of prior multi-layer battery separators by incorporating an incompatible resin with a thermoplastic resin of an internal layer of the multilayer structure. A multilayer structure as described herein has three or more layers, has at least two external layers, and at least one internal layer. The at least one internal layer may have a thickness, in some embodiments, from 0.1 to 10 microns, from 0.1 to 5 microns, from 0.1 to 4 microns, from 0.1 to 3 microns, from 0.1 to 2 microns, from 0.1 to 1 microns, or from 0.1 to 0.5 microns.

In one aspect, a multilayer porous membrane that may be used as a battery separator for a secondary battery is disclosed. The multilayer porous membrane is one in which at least one internal layer of the multilayer porous membrane comprises a thermoplastic resin and a first polymer that is incompatible with the thermoplastic resin.

In some preferred embodiments, the thermoplastic resin is a polyolefin. For example, the polyolefin may be at a polypropylene, a polyethylene, mixtures thereof, copolymers thereof, or terpolymers thereof.

In some embodiments, the first polymer may be a copolymer. In other embodiments, it may be a block copolymer.

The block copolymer may be a block copolymer that comprises one or more hard blocks and one or more soft blocks. For example, the block copolymer may have the following structure:

$$[CH2\text{-}CHR]_x\text{-}[soft\ block]_y,$$

where R is a C5-C10 ring that is aromatic or non-aromatic, x is >1, and y is >1.

In some embodiments, the block copolymer is a styrenic block copolymer. For example, the block copolymer may be at least one of a styrene-ethylene-butylene-styrene (SEBS), a styrene-ethylene-propylene-styrene (SEPS) styrenic block copolymer, a styrene-ethylene-ethylene-propylene-styrene (SEEPS) block co-polymer, a styrene-ethylene-propylene (SEP) block co-polymer, and a triblock copolymer having styrene endblocks and a middle block that may be hydrogenated or unhydrogenated.

In some embodiments, the block copolymer may be at least one selected from a polyethylene-polybutylene (C2-C4), a polyethylene-polypropylene (C2-C3), a polyethylene-polypentene (C2-C5), a polyethylene-polyhexene (C2-C6), a polyethylene-polyheptene (C2-C7), a polyethylene-polyoctene (C2-C8), a polyethylene-polynonene (C2-C9), and a polyethylene-polydecene (C2-C10) block copolymer.

In some embodiments, the at least one internal layer may contain the first polymer in an amount of 1 wt. % or more, 3 wt. % or more, 5 wt. % or more, or 10 wt. % or more.

In some embodiments the glass transition temperature ($T_g$) of the first polymer is lower than that of the thermoplastic resin.

In some embodiments, the multilayer porous membrane is a dry-process porous membrane.

In some embodiments, the multilayer porous membrane is free of compatibilizer, particularly free of any compatibilizer that compatibilizes the thermoplastic resin and the first polymer. No compatibilizer is used in the internal layer comprising the thermoplastic resin and the incompatible first polymer.

In some embodiments, the multilayer porous membrane has a puncture of 350 gf or more, 360 gf or more, 370 gf or more, or 380 gf or more at thicknesses of 14 microns or less.

In some embodiments, the multilayer porous membrane may have a coating on one or both sides thereof.

In another aspect a monolayer, bilayer, trilayer, or multilayer porous membrane is disclosed herein where at least one layer of the membrane comprises polyethylene and a polymer that is incompatible with polyethylene. In some embodiments, the at least one layer that contains polyethylene and a polymer that is incompatible with polyethylene is an internal, and in some embodiments it is an external layer. In some embodiments both an internal and an external layer comprise polyethylene and a polymer that is incompatible with polyethylene. For an internal layer, the amount of incompatible polymer may be greater than 1 wt. %, greater than 3 wt. %, greater than 5 wt. %, greater than 7 wt. %, greater than 10 wt. %, greater than 15 wt. %, or greater than 20 wt. %. For an external layer, the amount of incompatible polymer is less than 10 wt. % less than 7 wt. %, less than 5 wt. %, less than 3 wt. %, or less than 1 wt. %.

In another aspect, a battery separator comprising at least one multilayer porous membrane or at least one porous membrane as described herein is described. In some embodiments, a multilayer porous membrane of the battery separator may have a coating on one or both sides thereof.

In another aspect, a secondary battery comprising a battery separator as described herein is described.

DETAILED DESCRIPTION

Figure 1:
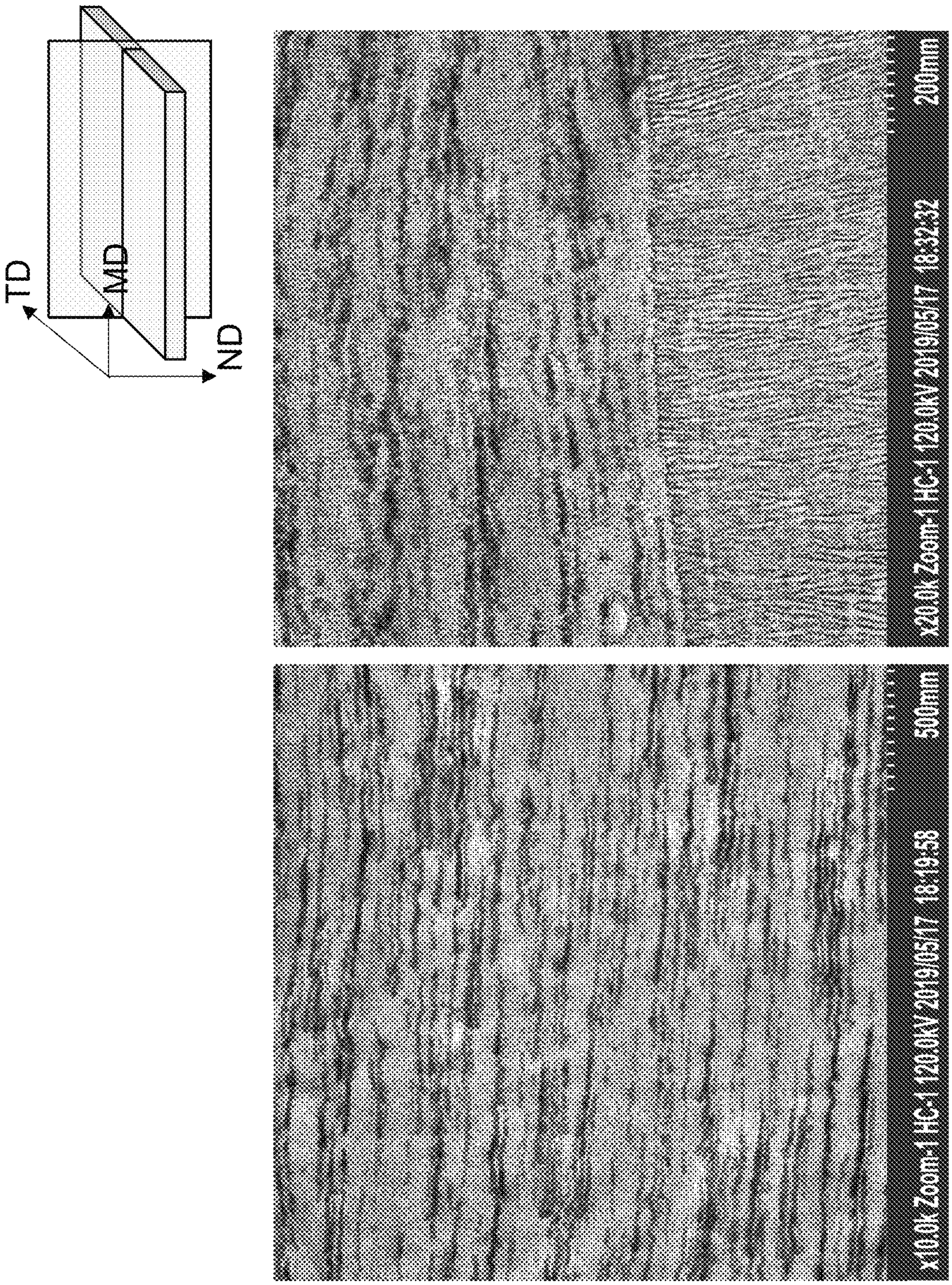
FIG. 1 is a TEM image of some embodiments described herein.

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, such as 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

I. Membranes

In an aspect, monolayer, bilayer, trilayer, or multilayer porous membrane is disclosed. In some embodiments, a monolayer, bilayer, trilayer, or multilayer microporous membrane is disclosed. While the term "membrane" will be used throughout this specification for purposes of simplicity, the term should be understood to also refer to a "thin film" or "separator". Additionally, the term "multilayer" will be used to generically describe porous membranes having two or more layers, unless expressly stated otherwise.

In a preferred embodiment, the membrane is a multilayer membrane comprising two external layers and at least one internal layer. In some embodiments, the multilayer membrane may have two or more, three or more, four or more, five or more, six or more, seven or more, eight or more, nine or more, ten or more, eleven or more, twelve or more, thirteen or more, fourteen or more, fifteen or more, sixteen or more, seventeen or more, eighteen or more, nineteen or more, or twenty or more internal layers.

In an embodiment, a porous membrane comprises a thermoplastic resin; and a first polymer that is incompatible with the thermoplastic resin. The porous membrane can be microporous, nanoporous, or a mixture of both. The porous membrane can be a monolayer, bilayer, trilayer, or multi-layer porous membrane. For example, an example of a multilayer membrane is described in WO/2018/089748, which is assigned to Celgard LLC and incorporated by reference herein. An example of a trilayer membrane is described, for example, in U.S. Pat. No. 6,080,507, which is assigned to Celgard LLC and incorporated by reference herein in its entirety.

Each layer can be mono-extruded, where the layer is extruded by itself as a monolayer, without any sublayers. Alternatively, each layer can comprise a plurality of co-extruded sublayers. For example, a co-extruded bi-sublayer, tri-sublayer, or multi-sublayer membrane are each collectively considered to be a "layer". The number of sublayers in coextruded bi-layer is two, the number of layers in a co-extruded tri-layer is three, and the number of layers in a co-extruded multi-layer membrane will be two or more, three or more, four or more, five or more, and so on. The exact number of sublayers in a co-extruded layer is dictated by the die design and not necessarily the materials that are co-extruded to form the co-extruded layer. For example, a co-extruded bi-, tri-, or multi-sublayer membrane can be formed using the same material in each of the two, three, or four or more sublayers, and these sublayers will still be considered to be separate sublayers even though each sublayer is made of the same material. Each layer comprising the co-extruded bi-, tri-, or multi-sublayer membranes can have a pre-stretched thickness of 1.2 mil or less, 1.1 mil or less, 1 mil or less, or 0.9 mil or less 0.8 mil or less, 0.75 mil or less, 0.5 mil or less, 0.4 mil or less, 0.3 mil or less, or 0.2 mil or less prior to stretching.

In some embodiments, the multilayer microporous membrane or multilayer microporous membrane disclosed herein comprises two, three, four or more co-extruded layers. Co-extruded layers are layers formed by a co-extrusion process. In some instances, the layers can be formed by the same or separate co-extrusion processes. The consecutive layers can be formed by the same co-extrusion process, or two or more layers can be coextruded by one process. Two or more layers can be coextruded by a separate process, and the two or more layers formed by the one process can be laminated to the two or more layers formed by the separate process so that combined there are four or more consecutive coextruded layers. In some embodiments, the co-coextruded layers are formed by the same co-extrusion process. For example, two or more, or three or more, four or more, five or more, six or more, seven or more, eight or more, nine or more, ten or more, fifteen or more, twenty or more, twenty-five or more, thirty or more, thirty-five or more, forty or more, forty-five or more, fifty or more, fifty-five or more or sixty or more co-extruded layers can be formed by the same co-extrusion process. The extrusion process can also be performed by extruding two or more polymer mixtures, that can be the same or different, with or without a solvent. In a preferred embodiment, the co-extrusion process is a dry process, such as Celgard® dry process, which does not use a solvent. In other instances, the co-extrusion process is a wet process. In other embodiments, the process can be a dry process other than the Celgard® dry process. For example, it may be a process where pores are formed using a pore former or nucleator. In the Celgard® dry process, pores are formed by stretching.

In some embodiments, the multilayer membrane described herein is made by forming a coextruded bi-layer (two coextruded layer), tri-layer (three coextruded layers), or multi-layer (two, three, or four or more co-extruded layers) membrane and then laminating the bi-layer, tri-layer, or multi-layer membrane to at least one or two other membranes, including other co-extruded bilayers, trilayer, and multilayers. The other membranes can be a non-woven or woven membrane, mono-extruded membranes, or other co-extruded membranes. In some embodiments, the other membranes are co-extruded membranes having the same number of co-extruded layers as the co-extruded bi-layer, tri-layer, or multi-layer membranes. Moreover, each of the co-extruded layers can comprise two, three, four, or more sublayers, as previously described herein.

Lamination of the bi-layer, tri-layer, or multilayer co-extruded membrane with at least one other monolayer membrane or a bi-layer, tri-layer, or multi-layer membrane can involve use of heat, pressure, or heat and pressure. Lamination forms a bond that is not meant to be broken and is not easily broken.

In some embodiments, one or more layers of the bilayer, trilayer, or multilayer membrane comprises a thermoplastic and a first polymer. In some cases, all layers of the bilayer, trilayer, or multilayer membrane comprise the thermoplastic and the first polymer.

In a preferred embodiment, at least one internal layer of a multilayer membrane comprises a thermoplastic resin and a first polymer that is incompatible with the thermoplastic resin. In some embodiments, all of the internal layers of the multilayer membrane comprise a thermoplastic resin and a first polymer that is incompatible with the thermoplastic resin, and in some embodiments some, but not all, of the internal layers if the multilayer membrane comprises a thermoplastic resin and a first polymer that is incompatible with the thermoplastic resin.

The thermoplastic resin can be any thermoplastic resin not inconsistent with the objectives of this disclosure. In general, the thermoplastic resin should be extrudable.

In some cases, the thermoplastic resin is a polyolefin. In a preferred embodiment, the polyolefin comprises a polypropylene, a polyethylene, mixtures thereof, and/or copolymers thereof. In some instances, a polyolefin includes, but is not limited to: polyethylene, polypropylene, polybutylene, polymethylpentene, copolymers thereof, and blends thereof. In some embodiments, the copolymer may be a copolymer of polyethylene and polypropylene wherein the amount of polyethylene is up to 20%, up to 15%, up to 10%, up to 5%, or up to 3%. In some embodiments, the polyolefin can be an ultra-low molecular weight, a low-molecular weight, a medium molecular weight, a high molecular weight, or an ultra-high molecular weight polyolefin, such as a medium or a high weight polyethylene (PE) or polypropylene (PP). For example, an ultra-high molecular weight polyolefin can have a molecular weight of 450,000 (450 k) or above, e.g. 500 k or above, 650 k or above, 700 k or above, 800 k or above, 1 million or above, 2 million or above, 3 million or above, 4 million or above, 5 million or above, 6 million or above, etc. A high-molecular weight polyolefin can have a molecular weight in the range of 250 k to 450 k, such as 250 k to 400 k, 250 k to 350 k, or 250 k to 300 k. A medium molecular weight polyolefin can have a molecular weight from 150 to 250 k, such as 100 k, 125 k, 130K, 140 k, 150 k to 225 k, 150 k to 200 k, 150 k to 200 k, etc. A low molecular weight polyolefin can have a molecular weight in the range of 100 k to 150 k, such as 100 k to 125 k. An ultra-low molecular weight polyolefin can have a molecular weight less than 100 k. The foregoing values are weight average molecular weights. In some embodiments, a higher molecular weight polyolefin can be used to increase strength or other properties of the microporous multilayer membranes or batteries comprising the same as described herein. In some embodiments, a lower molecular weight polymer, such as a medium, low, or ultra-low molecular weight polymer can be beneficial. For example, without wishing to be bound by any particular theory, it is believed that the crystallization behavior of lower molecular weight polyolefins can result in a microporous multilayer membrane having smaller pores resulting from at least an MD stretching process that forms the pores.

In some cases, the thermoplastic resin can comprise non-polyolefin polymers Exemplary non-polyolefin thermoplastic resin can include, but are not limited to: polyacetals (or polyoxymethylenes), polyamides, polyesters, polysulfides, polyvinyl alcohols, polyvinyl esters, and polyvinylidenes, such as polyvinylidene difluoride (PVDF), Poly (vinylidene fluoride-co-hexafluoropropylene) (PVDF:HFP), Polytetrafluoroethylene (PTFE), polyethylene oxide (PEO), Poly(vinyl alcohol) (PVA), Polyacrylonitrile (PAN), or the like. Polyamides (nylons) include, but are not limited to: polyamide 6, polyamide 66, Nylon 10, 10, polyphthalamide (PPA), co-polymers thereof, and blends thereof. Polyesters include, but are not limited to: polyester terephthalate, polybutyl terephthalate, copolymers thereof, and blends thereof. Polysulfides include, but are not limited to, polyphenyl sulfide, copolymers thereof, and blends thereof. Polyvinyl alcohols include, but are not limited to: ethylene-vinyl alcohol, copolymers thereof, and blends thereof. Polyvinyl esters include, but are not limited to, polyvinyl acetate, ethylene vinyl acetate, copolymers thereof, and blends thereof. Polyvinylidenes include, but are not limited to: fluorinated polyvinylidenes (such as polyvinylidene chloride, polyvinylidene fluoride), copolymers thereof, and blends thereof. Various materials can be added to the polymers. These materials are added to modify or enhance the performance or properties of an individual layer or the overall membrane. Such materials include, but are not limited to: Materials to lower the melting temperature of the polymer can be added. For example, when the multilayer membrane is a battery separator, the multi-layered separator includes a layer designed to close its pores at a predetermined temperature to block the flow of ions between the electrodes of a battery. This function is commonly referred to as shutdown.

In some embodiments, each layer or sublayer of each layer of multilayer membrane comprises, consists of, or consists essentially of a different thermoplastic resin, polymer, or co-polymer, or polymer or co-polymer blend. In some embodiments each layer comprises, consists of, or consists essentially of the same thermoplastic resin, polymer, or co-polymer, or polymer or co-polymer blend. In some embodiments, alternating layers of the multilayer microporous membrane or the multilayer membrane comprise, consist of, or consist essentially of the same thermoplastic resin, polymer, or co-polymer, or polymer or co-polymer blend. In other embodiments, some of the layers and/or sublayers of the multilayer membrane or microporous multilayer membrane comprise, consist of, or consist essentially of the same thermoplastic resin, polymer, or co-polymer, or polymer or co-polymer blend, and some do not. In some embodiments, each layer or sublayer further comprises the first polymer. In other embodiments, the first polymer is present in some, but not all of the layers or sublayers.

In some embodiments, the layers or sublayers of the multilayer membrane comprise, consist of, or consist essentially of polyolefin (PO) such as PP or PE or PE+PP blends, mixtures, co-polymers, or the like, and further comprise the first polymer (PY), additives, agents, materials, fillers, and/or particles (M), and/or the like that can be added or used and can form layers or microlayers such as PP+PY, PE+PY, PP+M, PE+M, PP+PE+PY, PE+PP+M, PP+PY+M, PE+PY+M, PP+PE+PY+M, or blends, mixtures, co-polymers, and/or the like thereof.

Identical, similar, distinct, or different PP or PE or PE+PP polymers, homopolymers, copolymers, molecular weights, blends, mixtures, co-polymers, or the like can also be used. For example, identical, similar, distinct, or different molecular weight PP, PE, and/or PP+PE polymers, homopolymers, co-polymers, multi-polymers, blends, mixtures, and/or the like can be used in each layer or sublayers. As such, constructions can include various combinations and sub-combinations of PP, PE, PP+PE, PP1, PP2, PP3, PE1, PE2, PE3, PP1+PP2, PE1+PE2, PP1+PP2+PP3, PE1+PE2+PE3, PP1+PP2+PE, PP+PE1+PE2, PP1/PP2, PP1/PP2/PP1, PE1/PE2, PE1/PE2/PP1, PE1/PE2/PE3, PP1+PE/PP2, or other combinations or constructions.

Providing the first polymer in an internal layer is beneficial because some of the problems of including the first polymer in an external layer may be avoided. For example, it is found that including a first polymer in an external layer may make the film tacky, causing it to stick to itself and negatively affecting pin removal force, which is an important property when the film is used as a battery separator. When used in an internal layer, more first polymer may be added to improve the physical properties of the film without making it too tacky. In some embodiments, the first polymer may also be included in at least one external layer, but in an amount that does not make the film too tacky.

As described above, the multilayer membrane can comprise two outer layers (a first outer layer and a second outer layer) and one or more inner layers. In some cases the multilayer membrane can comprise a plurality of inner layers. The inner layers can be mono-extruded or co-extruded layers. A lamination barrier can be formed between each of the inner layers and/or between each of the outer layers and one of the inner layers. A lamination barrier is formed when two surfaces, such as two surfaces of different membranes or layers are laminated together using heat, pressure, or heat and pressure. In some embodiments, the layers of the membrane areas have the following non-limiting constructions of the thermoplastic resin: PP, PE, PP/PP, PP/PE, PE/PP, PE/PE, PP/PP/PP, PP/PP/PE, PP/PE/PE. PP/PE/PP, PE/PP/PE, PE/PE/PP, PP/PP/PP/PP, PP/PE/PE/PP, PE/PP/PP/PE, PP/PE/PP/PP, PE/PE/PP/PP, PE/PP/PE/PP, PP/PE/PE/PE/PP, PE/PP/PP/PP/PE, PP/PP/PE/PP/PP, PE/PE/PP/PP/PE/PE, PP/PE/PP/PE/PP, PP/PP/PE/PE/PP/PP, PE/PE/PP/PP/PE/PE, PE/PP/PE/PP/PE/PP, PP/PE/PP/PE/PP/PE, PP/PP/PP/PE/PP/PP/PP, PE/PE/PE/PP/PE/PE/PE, PP/PE/PP/PE/PP/PE/PP, PE/PP/PE/PP/PE/PP/PE, PE/PP/PE/PP/PE/PP/PE/PP, PP/PE/PP/PE/PP/PE/PP/PE, PP/PP/PE/PE/PP/PP/PE/PE, PP/PE/PE/PE/PE/PE/PE/PP, PE/PP/PP/PP/PP/PP/PP/PE, PP/PP/PE/PE/PEPE/PP/PP, PP/PP/PP/PP/PE/PE/PE/PE, PP/PP/PP/PP/PE/PP/PP/PP/PP, PE/PE/PE/PE/PP/PE/PE/PE/PE, PP/PE/PP/PE/PP/PE/PP/PE/PP, PE/PP/PE/PP/PE/PP/PE/PP/PE, PE/PE/PE/PE/PE/PP/PP/PP/PP, PP/PP/PP/PP/PP/PE/PE/PE/PE, PP/PP/PP/PP/PP/PE/PE/PE/PE/PE, PE/PE/PE/PE/PE/PP/PP/PP/PP/

PP, PP/PE/PP/PE/PP/PE/PP/PE/PP/PE, PE/PP/PE/PP/PE/PP/PE/PP/PE/PP, PE/PP/PP/PP/PP/PP/PP/PP/PP/PP/PE, PP/PE/PE/PE/PE/PE/PE/PE/PE/PE/PP, PP/PP/PE/PE/PP/PP/PE/PE/PP/PP, PE/PE/PP/PP/PP/PP/PP/PP/PP/PE/PE, PP/PP/PP/PE/PE/PP/PP/PP/PP/PE, PE/PE/PE/PP/PP/PE/PE/PE/PP/PP. For purposes of reference herein PE denotes a single layer or sublayer within the multilayer membrane that comprises, consists of, or consists essentially of PE. Similarly, PP denotes a single layer or sublayer within the multilayer membrane that comprises, consists of, or consists essentially of PP.

The PE or PP composition in each of the different layers can be the same or different type of PE or PP compositions in the other layers. For example, a coextruded precursor can have a structure (PP1/PP2/PP3), (PP3/PP2/PP1), (PP3/PP3/PP2/PP1/PP1), (PP3/PP3/PP2/PP2/PP1/PP1), (PP3/PP3/PP3/PP2/PP2/PP2/PP1/PP1/PP1), and so on. PP1 is made of a homopolymer PP and an additive to modify the surface coefficient of friction, including any anti-slip or anti-block additives like polysiloxane or siloxane. PP2 can be made of the same or a different PP homopolymer than PP1 and a copolymer of PP. the PP copolymer can be any propylene-ethylene or ethylene-propylene random copolymer, block copolymer, or elastomer. PP3 can be made of the same or a different homopolymer PP than PP1 and PP2 and also includes an additive to modify surface coefficient of friction, which can be the same or different from that used in PP1. Stated differently, a multilayer membrane with a general structure of PP/PE/PP/PE/PP can comprise PP1/PE1/PP2/PE2/PP3, where each of the PP layers has a different polypropylene composition than the other two PP layers, and likewise for the two PE layers.

In another embodiment, the coextruded precursor can have a structure (PP1/PP2/PP3), (PP3/PP2/PP1), (PP3/PP3/PP2/PP1/PP1), (PP3/PP3/PP2/PP2/PP1/PP1), (PP3/PP3/PP3/PP2/PP2/PP2/PP1/PP1/PP1), and so on. PP1 can be any polypropylene blend. PP2 can be made of any polypropylene block co-polymer, including those described herein. PP3 can be made of the same or a different polypropylene-block co-polymer than that used in PP2.

The individual layers in the multilayer membrane can comprise a plurality of sublayers, which can be formed by co-extrusion or combining the individual sublayers to form the individual layer of the multilayer membrane. Using a multilayer membrane having a structure of PP/PE/PP/PE/PP, each individual PP or PE layer can comprise two or more co-extruded sublayers. For example, when each individual PP or PE layer comprises three sublayers, each individual PP layer can be expressed as PP=(PP1,PP2,PP3) and each individual PE layer can be expressed as PE=(PE1,PE2,PE3). Thus, the structure of PP/PE/PP/PE/PP can be expressed as (PP1,PP2,PP3)/(PE1,PE2,PE3)/(PP1,PP2,PP3)/(PE1,PE2,PE3)/(PP1,PP2,PP3). The composition of each of the PP1, PP2, and PP3 sublayers can be the same, or each sublayer can have a different polypropylene composition than one or both of the other polypropylene sublayers. Similarly, composition of each of the PE1, PE2, and PE3 sublayers can be the same, or each sublayer can have a different polyethylene composition than one or both of the other polyethylene sublayers. This principle applies to other multilayer membranes having more or less layers that the above-described exemplary penta-layer membrane.

The maximum average thickness the membranes may be 50 microns, less than 40 microns, less than 30 microns, less than 25 microns, less than 20 microns, less than 19 microns, less than 18 microns, less than 17 microns, less than 16 microns, less than 15 microns, less than 14 microns, less than 13 microns, less than 12 microns, less than 11 microns, less than 10 microns, less than 9 microns, less than 8 microns, less than 7 microns, less than 6 microns, less than 5 microns, less than 4 microns, less than 3 microns, or less than 2 microns. This is the thickness of the multilayer membranes or membranes before any coating or treatment is applied thereto.

The average thickness of the layers or sublayers may be less than 15 microns, less than 14 microns, less than 13 microns, less than 12 microns, less than 11 microns, less than 10 microns, less than 9 microns, less than 8 microns, less than 7 microns, less than 6 microns, less than 5 microns, less than 4 microns, less than 3 microns, less than 2 microns, less than 1 microns, less than 500 nm, less than 400 nm, less than 300 nm, less than 200 nm, or less than 100 nm.

Microporous as used herein means that the average pore size of the 2 microns or less, 1 micron or less, 0.9 microns or less, 0.8 microns or less, 0.7 microns or less, 0.6 microns or less, 0.5 microns or less, 0.4 microns or less, 0.3 microns or less, 0.2 microns or less, and 0.1 microns or less, 0.09 microns or less, 0.08 microns or less, 0.07 microns or less, 0.06 microns or less, 0.05 microns or less, 0.04 microns or less, 0.03 microns or less, 0.02 microns or less, or 0.01 microns or less. In some embodiments, pores can be formed, for example, by performing a stretching process on a precursor membrane, such as is done in the Celgard® dry stretch process.

In some embodiments, where one or more layers of the multilayer membrane comprises, consists of, or consists essentially of microporous PE, the average pore size in the PE layer is between 0.03 and 0.1, between 0.05 to 0.09, 0.05 to 0.08, 0.05 to 0.07, or 0.05 to 0.06.

In some embodiments, where one or more layers of the multilayer membrane comprises, consists of, or consists essentially of microporous PP, the average pore size in the PP layer is between 0.02 to 0.06, 0.03 to 0.05, and more 0.04 to 0.05 or 0.03 to 0.04.

In instances where the multilayer microporous membrane or membrane comprises layers comprising, consisting of, or consisting essentially of PP and comprises other layers comprising, consisting of, or consisting essentially of PE, the average pore size of the PP layers is smaller than that of the PE layers.

The porosity of the microporous multilayer membrane can be any porosity not inconsistent with the goals of this disclosure. For example, any porosity that could form an acceptable battery separator is acceptable. In some embodiments, the porosity of the membrane or membrane can be from 10% to 80%, from 10 to 60%, from 20 to 60%, from 30 to 60%, or from 40 to 60%.

In addition to the thermoplastic resin, each of the layers or sublayers of the porous membrane can comprise the incompatible first polymer; or the incompatible first polymer can be present in some, but not all of the layers or sublayers. In other embodiments, the incompatible first polymer is present only in the inner layers or sublayers of the porous membrane. Incompatibility when referring to a blend of polymers is understood in the art. Incompatible polymer blends are heterogeneous. The morphology of incompatible polymer blends depend on a variety of factors, among them are the following: dispersion degree of the two phases, and shape and dimensions of the dispersed particles. In turn, these factors are determined by the rheological characteristics of the two components and by the mixing conditions.

The incompatible first polymer can be a copolymer in some embodiments. In a preferred embodiment, the copolymer is a block copolymer. Block copolymers generally comprise two or more strands, known as "blocks," of different polymers chemically attached to each other. The properties of these polymers depend on the chemical composition of the blocks, the sequence of copolymer distribution in the polymer chain, and the molecular weight distribution of the blocks and copolymer. In some instances, copolymers described herein comprise two or more block types that have different physical properties from each other. For instances, in some embodiments, a block copolymer described herein comprises one or more hard blocks and one or more soft blocks. The terms "hard" and "soft" refer the relative elastic properties of the block. Generally, "hard" blocks comprise a polymer or copolymer sequence that exhibits a more rigid structure at room temperature. In contrast, "soft" blocks comprise a polymer or copolymer sequence that exhibits higher elasticity at room temperature than the "hard" blocks. Stated differently, a hard block has a higher hardness than a soft block as measured by the Rockwell hardness test or Shore hardness test.

The incompatible first polymer can be present in any layer or sublayer in any amount not inconsistent with the objectives of this disclosure. In some embodiments, any layer or sublayer of the porous membrane comprises 5% or less, 4% or less, 3% or less, 2% or less, or 1% or less of the first polymer. In some cases, any layer or sublayer of the porous membrane comprises 5% or more, 6% or more, 7% or more, 8% or more, 9% or more, 10% or more, 11% or more, 12% or more, 13% or more, 14% or more, or 15% or more of the first polymer. In some embodiments where the porous membrane is a trilayer or multilayer membrane, an internal layer or sublayer of the porous membrane comprises 5% or more, 6% or more, 7% or more, 8% or more, 9% or more, 10% or more, 11% or more, 12% or more, 13% or more, 14% or more, or 15% or more of the first polymer. In some embodiments, external layers have 5% or less of the first polymer. Without wishing to be bound by any particular theory, it is believed that adding more than 5% in an external layer may make the film to tacky or increase pin removal force too much making the membrane undesirable for use as a battery separator in certain applications.

In an embodiment, the block copolymer is a styrene block copolymer, such as a hydrogenated styrenic block copolymer (HSBC). In some cases, the styrene block copolymer has a di-block or tri-block configuration, such as an A-B, A-B-A, or B-A-B configuration, where A is a hard block and B is a soft block. In some cases, the styrene block copolymer has styrene based hard-blocks and a diene soft block. The styrene block copolymer can comprise hydrogenated di-block and tri-block styrene copolymers that exhibit rubber-like properties over a broad temperature range. In comparison to non-hydrogenated styrenic block copolymers, hydrogenated styrene copolymers exhibit better tensile strength, better heat, weather, and ozone resistance, and better compatibility with poly-olefins. Prior to processing, the polystyrene end blocks are associated in rigid domains and act as a crosslinking point below the glass transition temperature (Tg) of polystyrene, and the soft block provides elasticity. In the presence of heat and shear during processing, the polystyrene domains soften and permit flow. After cooling, the polystyrene domains reform and harden, locking the rubber network in place. This physical phenomenon provides the styrene block copolymer with its high tensile strength and elasticity. In some cases, due to its thermoplastic properties, the styrene block copolymer is recyclable.

In some embodiments, the styrene block copolymer imparts increased elongation properties when blended with a thermoplastic resin, such as polypropylene or polyethylene. The styrene block copolymer is incompatible with the thermoplastic resin, meaning that the styrene block copolymer does not readily disperse in the thermoplastic resin during mixing. Instead, the styrene block copolymer segregates in the extruded film and orients in the machine direction (MD). In some embodiments, the styrene block copolymer forms rod-like domains in the MD. In some cases, the styrene block copolymer maintains the same morphology after annealing the extruded film, individual styrene block copolymers can fuse together to form larger domains. In some instances where each layer comprises three or more sublayers, the styrene block copolymer can form larger fused domains in the inner sublayers than in the outer sublayers.

The styrene block copolymer can have an overall styrene content of 5-70%, 10%, 11%, 12%, 13%, 14%, 15%, 16%, 17%, 18%, 19%, 20%, 25%, 26%, 27%, 28%, 29%, 30%, 31%, 32%, 33%, 34%, 35%, 36%, 37%, 38%, 39%, 40%, 41%, 42%, 43%, 44% 45%, 46%, 47%, 48%, 49% 50%, 51%, 52%, 53%, 54%, 55%, 56%, 57%, 58%, 59%, 60%, 61%, 62%, 63%, 64%, 65%, 66%, 67%, 68%, 69% 70%, 71%, 72%, 73%, 74% or 75%. The styrene block copolymer can have a hardness type A of 30-98, 30, 35, 40, 45, 50, 55, 60, 65, 70, 75, 80, 85, 90, 95, 98, 100, or more than 100.

An exemplary di-block (A-B) styrene copolymer is shown in Formula 1, and an exemplary tri-block (A-B-A) styrene copolymer is shown in Formula 2, Formula 3, and Formula 4 below:

(1)

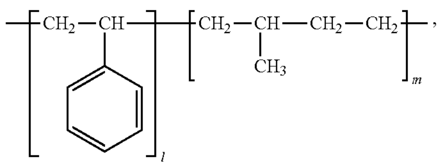

(2)

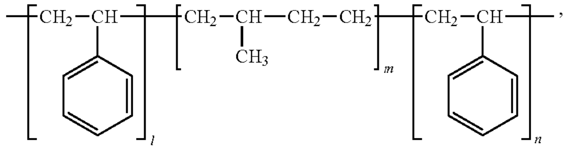

(3)

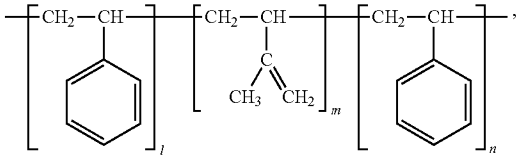

(4)

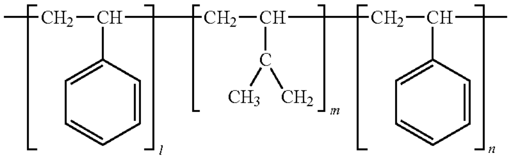

Exemplary random block co-polymers are shown in Formulae (5), (6), (7), and (8) below:

(5)

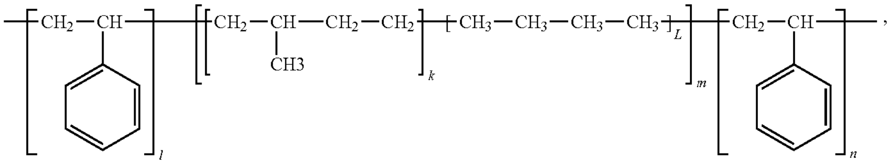

(6)

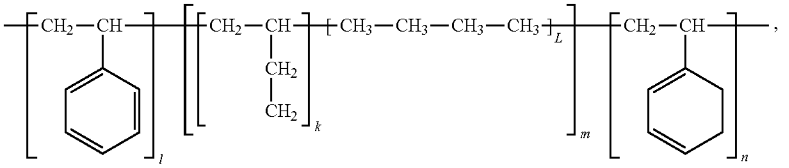

(7)

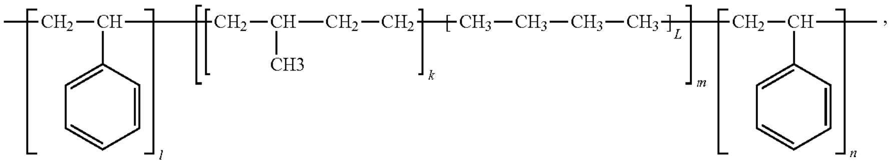

and (8)

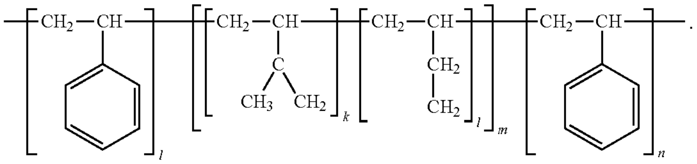

In some embodiments, the first polymer is a polyethylene/poly 1-butylene copolymer, polyethylene/poly 1-hexene copolymer, or polyethylene/poly 1-octene copolymer. These polymers may be random copolymers or block copolymers, or may be a blocked polymer with polystyrene and a polyethylene/poly 1-butene copolymer component (for example, SEBS), etc. Each component of the polyethylene/poly 1-butylene copolymer, polyethylene/poly 1-hexene copolymer, or polyethylene/poly 1-octene copolymer has an advantage of high interfacial adhesiveness with polypropylene, allowing the polymer to be micro-dispersed. Namely, these copolymer components are high molecular weight components likely to be oriented in parallel to the MD direction of the microporous membrane. In other embodiments, the first polymer may be a block copolymer of styrene, ethylene, and propylene (for example, SEP, SEPS, SEEPS, or SEEPS-OH). In some embodiments, the first polymer may be a block copolymer of styrene and butadiene (for example, SBS) or of styrene and isoprene (for example, SIS).

The glass transition temperature ($T_g$) of the incompatible first polymer is lower than that of the thermoplastic resin in some instances. While not intended to be bound by theory, it is believed that the combination of hard and soft blocks of the incompatible first polymer together dissipate energy, essentially acting as a shock absorber, which results in improvement in puncture strength.

The porous membrane can have improved puncture strength in some cases when one or more layers or sublayers comprise a combination of the thermoplastic resin and incompatible first polymer compared to microporous membranes with all the sublayers or layers only comprising the thermoplastic resin. In some cases, porous membranes having layers or sublayers comprising the combination have an increased puncture strength of 5%, 7%, 9% 11%, 13%, 15%, 17%, 19%, 20%, 21%, 23%, 25%, or greater than 25% compared to porous membranes without the incompatible first polymer present. In some embodiments, porous membranes described herein have a puncture strength of 350 gf or more, 360 gf or more, 370 gf or more, 380 gf or more, 400 gf or more, 410 gf or more, 420 gf or more, 430 gf or more, 440 gf or more, or 450 gf or more. The puncture strengths are normalized for a thickness of about 14 microns. Normalization is necessary due to the fact thicker membranes, that are otherwise identical, will have higher puncture strength than thinner, otherwise identical, membranes.

In some embodiments, a porous membrane described herein is free of a compatibilizer. As understood in the art, compatibilizers are components or compounds that can make incompatible polymers compatible.

Porous membranes described herein can further comprise a second polymer that is incompatible with the thermoplastic resin, where the second polymer is different from the first polymer. The second polymer can be a second copolymer, such as a second block copolymer. In some embodiments, the block copolymer comprises one or more hard blocks and one or more soft blocks. The second polymer can be used in combination with the first polymer, such as in the same layer or sublayer of the porous membrane as the first polymer. The second polymer can also be used only in combination with the thermoplastic resin in a layer or sublayer, where the second polymer is present in one or more layers or sublayers and the first polymer is present in one or more layers or sublayers. The second polymer can be any block copolymer described herein for the first polymer.

In some embodiments, the multilayer microporous membrane described herein can additionally comprise one or more additives in at least one layer of the multilayer microporous membrane. In some embodiments, at least one layer of the multilayer microporous membranes comprises more than one, such as two, three, four, five, or more, additives. Additives can be present in one or both of the outermost layers of the multilayer microporous membrane, in one or more inner layers, in all of the inner layers, or in all of the inner and both of the outermost layers. In some embodiments, additives can be present in one or more outermost layers and in one or more innermost layers. In such embodiments, over time, the additive can be released from the outermost layer or layers and the additive supply of the outermost layer or layers can be replenished by migration of the additive in the inner layers to the outermost layers. In some embodiments, each layer of the multilayer microporous membrane can comprise a different additive or combination of additives than an adjacent layer of the or each layer of the multilayer microporous membrane.

In some embodiments, the additive is, comprises, consists of, or consists essentially of a functionalized polymer. As understood by one of ordinary skill in the art, a functionalized polymer is a polymer with functional groups coming off of the polymeric backbone. Exemplary functional groups include: In some embodiments, the functionalized polymer is a maleic anhydride functionalized polymer. In some embodiments the maleic anhydride modified polymer is a maleic anhydride homo-polymer polypropylene, copolymer polypropylene, high density polypropylene, low-density polypropylene, ultra-high density polypropylene, ultra-low density polypropylene, homo-polymer polyethylene, copolymer polyethylene, high density polyethylene, low-density polyethylene, ultra-high density polyethylene, ultra-low density polyethylene, In some embodiments, the additive comprises, consists of, or consists essentially of an ionomer. An ionomer, as understood by one of ordinary skill in the art is a copolymer containing both ion-containing and non-ionic repeating groups. Sometimes the ion-containing repeating groups can make up less than 25%, less than 20%, or less than 15% of the ionomer. In some embodiments, the ionomer can be a Li-based, Na-based, or Zn-based ionomer.

In some embodiments, the additives comprises cellulose nanofiber.

In some embodiments, the additive comprises inorganic particles having a narrow size distribution. For example, the difference between D10 and D90 in a distribution is less than 100 nanometers, less than 90 nanometers, less than 80 nanometers, less than 70 nanometers, less than 60 nanometers, less than 50 nanometers, less than 40 nanometers, less than 30 nanometers, less than 20 nanometers, or less than 10 nanometers. In some embodiments, the inorganic particles are selected from at least one of $SiO_2$, $TiO_2$, or combinations thereof.

In some embodiments, the additive can comprise, consists of, or consist essentially of a lubricating agent. The lubricating agent or lubricant described herein is not so limited. As understood by one of ordinary skill in the art, a lubricant is a compound that acts to reduce the frictional force between a variety of different surfaces, including the following: polymer:polymer; polymer:metal; polymer:organic material; and polymer:inorganic material. Specific examples of lubricating agents or lubricants as described herein are compounds comprising siloxy functional groups, including siloxanes and polysiloxanes, and fatty acid salts, including metal stearates.

Compounds comprising two or more, three or more, four or more, five or more, six or more, seven or more, eight or more, nine or more, or ten or more siloxy groups can be used as the lubricant described herein. Siloxanes, as understood by those in the art, are a class of molecules with a backbone of alternating silicon atom (Si) and oxygen (O) atoms, each silicon atom can have a connecting hydrogen (H) or a saturated or unsaturated organic group, such as —CH3 or C2H5. Polysiloxanes are a polymerized siloxanes, usually having a higher molecular weight. In some embodiments described herein, the polysiloxanes can be high molecular weight, such as ultra-high molecular weight polysiloxanes. In some embodiments, high and ultra-high molecular weight polysiloxanes can have weight average molecular weights ranging from 500,000 to 1,000,000.

The fatty acid salts described herein are also not so limited and can be any fatty acid salt that acts as a lubricant. The fatty acid of the fatty acid salt can be a fatty acid having between 12 to 22 carbon atoms. For example, the metal fatty acid can be selected from the group consisting of: Lauric acid, myristic acid, palmitic acid, stearic acid, oleic acid, linoleic acid, linolenic acid, palmitoleic acid, behenic acid, erucic acid, and arachidic acid. The metal can be any metal not inconsistent with the objectives of this disclosure. In some instances, the metal is an alkaline or alkaline earth metal, such as Li, Be, Na, Mg, K, Ca, Rb, Sr, Cs, Ba, Fr, and Ra. In some embodiments, the metal is Li, Be, Na, Mg, K, or Ca.

The fatty acid salt can be lithium stearate, sodium stearate, lithium oleate, sodium oleate, sodium palmitate, lithium palmitate, potassium stearate, or potassium oleate.

The lubricant, including the fatty acid salts described herein, can have a melting point of 200° C. or above, 210° C. or above, 220° C. or above, 230° C. or above, or 240° C. or above. A fatty acid salt such as lithium stearate (melting point of 220° C.) or sodium stearate (melting point 245 to 255° C.) has such a melting point. A fatty acid salt such as calcium stearate (melting point 155° C.) does not. The inventors of this application have found that calcium stearate is less ideal, from a processing standpoint, than other fatty acid metal salts, such as metal stearates, having higher melting points. Particularly, it has been found that calcium stearate could not be added in amounts above 800 ppm without what has been termed a "snowing effect" where wax separates and gets everywhere during a hot extrusion process. Without wishing to be bound by any particular theory, using a fatty acid metal salt with a melting point above the hot extrusion temperatures is believed to solve this "snowing" problem. Fatty acid salts having higher melting points than calcium stearate, particularly those with melting points above 200° C., can be incorporated in amounts above 1% or 1,000 ppm, without "snowing." Amounts of 1% or above have been found to be important for achieving desired properties such as improved wettability and pin removal improvement.

In some embodiments, the additive can comprise, consist of, or consist essentially of one or more nucleating agents. As understood by one of ordinary skill in the art, nucleating agents are, in some embodiments, materials, inorganic materials, that assist in, increase, or enhance crystallization of polymers, including semi-crystalline polymers.

In some embodiments, the additive can comprise, consist of, or consist essentially of cavitation promoters. Cavitation promoters, as understood by those skilled in the art, are materials that form, assist in formation of, increase formation of, or enhance the formation of bubbles or voids in the polymer.

In some embodiments, the additive can comprise, consist of, or consist essentially of a fluoropolymer. The fluoropolymer is not so limited and in some embodiments is PVDF.

In some embodiments, the additive can comprise, consist of, or consist essentially of a cross-linker.

In some embodiments, the additive can comprise, consist of, or consist essentially of an x-ray detectable material. The x-ray detectable material is not so limited and can be any material, for example, those disclosed in U.S. Pat. No. 7,662,510, which is incorporated by reference herein in its entirety. Suitable amounts of the x-ray detectable material or element are also disclosed in the '510 patent, but in some embodiments, up to 50 weight %, up to 40 weight %, up to 30 weight %, up to 20 weight %, up to 10 weight %, up to 5 weight %, or up to 1 weight % based on the total weight of the microporous membrane or membrane can be used. In an embodiment, the additive is barium sulfate.

In some embodiments, the additive can comprise, consist of, or consist essentially of a lithium halide. The lithium halide can be lithium chloride, lithium fluoride, lithium bromide, or lithium iodide. The lithium halide can be lithium iodide, which is both ionically conductive and electrically insulative. In some instances, a material that is both ionically conductive and electrically insulative can be used as part of a battery separator.

In some embodiments, the additive can comprise, consist of, or consist essentially of a polymer processing agent. As understood by those skilled in the art, polymer processing agents or additives are added to improve processing efficiency and quality of polymeric compounds. In some embodiments, the polymer processing agent can be antioxidants, stabilizers, lubricants, processing aids, nucleating agents, colorants, antistatic agents, plasticizers, or fillers.

In some embodiments, the additive can comprise, consist of, or consist essentially of a high temperature melt index (HTMI) polymer. The HTMI polymer is not so limited and can be at least one selected from the group consisting of PMP, PMMA, PET, PVDF, Aramid, syndiotactic polystyrene, and combinations thereof.

In some embodiments, the additive can comprise, consist of, of consist essentially of an electrolyte additive. Electrolyte additives as described herein are not so limited as long as the electrolyte is consistent with the stated goals herein. The electrolyte additive can be any additive typically added by battery makers, particularly lithium battery makers to improve battery performance. Electrolyte additives must also be capable of being combined, such as miscible, with the polymers used for the polymeric microporous membrane or compatible with the coating slurry. Miscibility of the additives can also be assisted or improved by coating or partially coating the additives. For example, exemplary electrolyte additives are disclosed in *A Review of Electrolyte Additives for Lithium-Ion Batteries*, J. of Power Sources, vol. 162, issue 2, 2006 pp. 1379-1394, which is incorporated by reference herein in its entirety. In some embodiments, the electrolyte additive is at least one selected from the group consisting of a solid electrolyte interphase (SEI) improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, and a viscosity improver. In some embodiments the additive can have more than one property, such as it can be a wetting agent and a viscosity improver.

Exemplary SEI improving agents include VEC (vinyl ethylene carbonate), VC (vinylene carbonate), FEC (fluoroethylene carbonate), LiBOB (Lithium bis(oxalato) borate). Exemplary cathode protection agents include N,N'-dicyclohexylcarbodiimide, N,N-diethylamino trimethylsilane, LiBOB. Exemplary flame-retardant additives include TTFP (tris(2,2,2-trifluoroethyl) phosphate), fluorinated propylene carbonates, MFE (methyl nonafluorobuyl ether). Exemplary $LiPF_6$ salt stabilizers include LiF, TTFP (tris(2,2,2-trifluoroethyl) phosphite), 1-methyl-2-pyrrolidinone, fluorinated carbamate, hexamethyl-phosphoramide. Exemplary overcharge protectors include xylene, cyclohexylbenzene, biphenyl, 2,2-diphenylpropane, phenyl-tert-butyl carbonate. Exemplary Li deposition improvers include $AlI_3$, $SnI_2$, cetyltrimethylammonium chlorides, perfluoropolyethers, tetraalkylammonium chlorides with a long alkyl chain. Exemplary ionic salvation enhancer include 12-crown-4, TPFPB (tris(pentafluorophenyl)). Exemplary Al corrosion inhibitors include LiBOB, LiODFB, such as borate salts. Exemplary wetting agents and viscosity dilutersinclude cyclohexane and $P_2O_5$.

In some embodiments, the electrolyte additive is air stable or resistant to oxidation. A battery separator comprising the electrolyte additive disclosed herein can have a shelf life of weeks to months, e.g. one week to 11 months.

In some embodiments, the additive can comprise, consist of, or consist essentially of an energy dissipative non-miscible additive. Non-miscible means that the additive is not miscible with the polymer used to form the layer of the multilayer microporous membrane or membrane that contains the additive.

The multilayer membrane can be stretched in a machine direction (MD) to make the multilayer membrane microporous. In some instances, the microporous multilayer membrane is produces by transverse direction (TD) stretching of the MD stretched microporous multilayer membrane. In addition to a sequential MD-TD stretching, the multilayer membrane can also simultaneously undergo a biaxial MD-TD stretching. Moreover, the simultaneous or sequential MD-TD stretched microporous multilayer membrane can be followed by a subsequent calendering step to reduce the membrane's thickness, reduce roughness, reduce percent porosity, increase TD tensile strength, increase uniformity, and/or reduce TD splittiness. In some embodiments, the multilayer membrane is TD stretched 1×, 2×, 3×, 4×, 5×, 6×, 7×, 8×, 9×, 10×, or more than 10×.

In an embodiment, a multilayer membrane can be manufactured using an exemplary process that includes stretching and a subsequent calendering step such as a machine direction stretching followed by transverse direction stretching (with or without machine direction relax) and a subsequent calendering step as a method of reducing the thickness of such a stretched membrane, for example, a multilayer porous membrane, in a controlled manner, to reduce the percent porosity of such a stretched membrane, for example, a multilayer porous membrane, in a controlled manner, and/or to improve the strength, properties, and/or performance of such a stretched membrane, for example, a multilayer porous membrane, in a controlled manner, such as the puncture strength, machine direction and/or transverse direction tensile strength, uniformity, wettability, coatability, runnability, compression, spring back, tortuosity, permeability, thickness, pin removal force, mechanical strength, surface roughness, hot tip hole propagation, and/or combinations thereof, of such a stretched membrane, for example, a multilayer porous membrane, in a controlled manner, and/or to produce a unique structure, pore structure, material, membrane, base film, and/or separator.

In some instances, the TD tensile strength of the multilayer membrane can be further improved by the addition of a calendering step following TD stretching. The calendering process typically involves heat and pressure that can reduce the thickness of a porous membrane. The calendering process step can recover the loss of MD and TD tensile strength caused by TD stretching. Furthermore, the increase observed in MD and TD tensile strength with calendering can create a more balanced ratio of MD and TD tensile strength which can be beneficial to the overall mechanical performance of the multilayer membrane.

The calendering process can use uniform or non-uniform heat, pressure and/or speed to selectively densify a heat sensitive material, to provide a uniform or non-uniform calender condition (such as by use of a smooth roll, rough roll, patterned roll, micro pattern roll, nano pattern roll, speed change, temperature change, pressure change, humidity change, double roll step, multiple roll step, or combinations thereof), to produce improved, desired or unique structures, characteristics, and/or performance, to produce or control the resultant structures, characteristics, and/or performance, and/or the like. In an embodiment, a calendering temperature of 50° C. to 70° C. and a line speed of 40 to 80 ft/min can be used, with a calendering pressure of 50 to 200 psi. The higher pressure can in some instances provide a thinner separator, and the lower pressure provide a thicker separator.

In some embodiments, one or more coating layers can be applied to one or two sides of the multilayer membrane. In some embodiments, one or more of the coatings can be a ceramic coating comprising, consisting of, or consisting essentially of a polymeric binder and organic and/or inorganic particles. In some embodiments, only a ceramic coating is applied to one or both sides of the microporous membrane. In other embodiments, a different coating can be applied to the microporous membrane before or after the application of the ceramic coating. The different additional coating can be applied to one or both sides of the membrane or film also. In some embodiments, the different polymeric coating layer can comprise, consist of, or consist essentially of at least one of polyvinylidene difluoride (PVdF) or polycarbonate (PC).

In some embodiments, the thickness of the coating layer is less than about 12 μm, sometimes less than 10 μm, sometimes less than 9 μm, sometimes less than 8 μm, sometimes less than 7 μm, and sometimes less than 5 μm. In at least certain selected embodiments, the coating layer is less than 4 μm, less than 2 μm, or less than 1 μm.

The coating method is not so limited, and the coating layer described herein can be coated onto a porous substrate by at least one of the following coating methods: extrusion coating, roll coating, gravure coating, printing, knife coating, air-knife coating, spray coating, dip coating, or curtain coating. The coating process can be conducted at room temperature or at elevated temperatures.

The coating layer can be any one of nonporous, nanoporous, microporous, mesoporous or macroporous. The coating layer can have a JIS Gurley of 700 or less, sometimes 600 or less, 500 or less, 400 or less, 300 or less, 200 or less, or 100 or less.

One or more layers, treatments, materials, or coatings (CT) and/or nets, meshes, mats, wovens, or non-wovens (NW) can be added on one or both sides, or within the multilayer film or membrane (M) described herein, which can include but not limited to CT/M, CT/M/CT, NW/M, NW/M/NW, CT/M/NW, CT/NW/M/NW/CT, CT/M/NW/CT, etc.

II. Battery Separator

In another aspect, a battery separator comprises a porous membrane as described in Section I herein. The porous membrane itself, i.e., without a coating or any other additional components, exhibits the improved properties described above. The performance of the porous membrane can be further enhanced by the optional addition of coatings or other additional components to one or two sides of the membrane, or by the described MD, MD-TD or MD-TD-stretching and calendering.

III. Secondary Battery

In an aspect, a secondary battery comprising a battery separator described in Section II herein. The secondary battery can exhibit improved properties compared to conventional secondary batteries. In some embodiments, the secondary battery is a lithium ion battery.

IV. Methods of Making a Porous Membrane

The porous membrane according to Section I herein can be produced into film form by using a monoextrusion facility, a coextrusion facility, or a laminate facility. As one example, two or more layers of resin compositions having identical components are laminated to prepare a raw film followed by pore opening upon stretching of the two or more layers of the multi-layered membrane to manufacture a porous membrane. As another example, at least one porous membrane containing a polypropylene resin as a main component and at least one porous membrane containing a polyethylene resin as a main component are laminated to prepare a raw film, followed by pore opening upon stretching of the two or more layers of the multi-layered membrane to manufacture a porous membrane. In some cases, it is easier to obtain a porous membrane having higher strength by preparing a raw film in which two or more layer films are first laminated, and then followed by pore opening upon stretching of the film to manufacture a porous membrane, rather than by preparing a raw film using a single layer film followed by the pore opening upon stretching of the film. From this viewpoint, in the case of a multilayered film in which a plurality of polyolefin-based porous layers are laminated, three or more polyolefin-based porous layers are preferably laminated, at least two of a porous layer (PP porous layer) containing a polypropylene resin as a major component and at least one porous layer (PE porous layer) containing a polyethylene resin as a main component are more preferably laminated, and the three-layer membrane of PP porous layer/PE porous layer/PP porous layer laminated in this order, is further preferable. As previously discussed, each of the PP and PE layers can also comprise the incompatible first polymer, whether in the PP or PE layer or within a sublayer of the PP or PE layers. In some embodiments, the incompatible first polymer can be present on some, but not all of the PP or PE layers or sublayers.

As a method for producing a multi-layered membrane in which a plurality of polyolefin-based porous layers are laminated or a method for producing a composite porous membrane having a polyolefin-based porous membrane and another resin porous membrane, for example, a method in which the respective layers are closely attached with each other by a coextrusion method, a laminate method in which the respective layers are extrusion molded separately and then closely contacted with each other, etc., can be adopted. As the laminate method, both a dry laminate method using an adhesive, etc., and a heat laminate method of adhering a plurality of layers by applying heat can be adopted.

The porous membrane is preferably manufactured by a dry stretching method in which the film is directly stretched and oriented after melt-kneaded in an extruder without using a solvent, followed by being subjected to an annealing step, cold stretching step, and hot stretching step in this order. A method for extruding a molten resin followed by orientation upon stretching of the resin, a circular die extrusion method, etc., can be utilized. Particularly the circular die extrusion method is preferable because the membrane can be made into a thin film form. The dry stretching method, in particular, a method of orientating a lamella crystalline followed by pore opening caused by interfacial delamination of the crystals, facilitates to align the pore portion, in contrast to a wet method, and the porous membrane obtained by the method is capable of exhibiting low air permeability resistance with respect to porosity, which is preferable.

Pore opening upon stretching of a film will be described in more detail. A single layer body or multi-layered body of the aforementioned raw films are subjected to stretching treatment. As a stretching condition, uniaxial stretching (MD stretching) can be adopted. A stretching temperature can be adjusted as appropriate according to processing characteristics of a microporous membrane layer (a) of a polypropylene resin or a microporous membrane layer (b) of a polyethylene resin, and further according to an aspect of voids formed in each layer. By such stretching treatment, the voids are provided in each of the microporous membrane layer (a) of polypropylene and polyethylene layer (b). Here, a mechanism (method) of providing the voids includes, for example, a pore opening method at an interface of lamellar crystalline. The pore opening method at a crystalline interface includes a method of preparing a precursor film by melt-extruding, for example, a crystalline resin such as polyethylene, etc., with a high draw down ratio, annealing the precursor film in a temperature range lower by 5 to 50° C. than the crystalline melting point of the crystalline resin to form an annealed precursor film, and subjecting the annealed precursor film to cold uniaxial stretching in temperature range between −20° C. to 70° C. to a factor of 1.1 to 2 followed by uniaxial stretching in a temperature range lower by 5 to 50° C. than the crystalline melting point of the crystalline resin to a factor of 1.5 to 5 to obtain a microporous membrane (i.e., providing voids in the membrane).

A polyolefin resin composition containing a polyolefin resin and a incompatible first polymer as desired can be produced by a melt-kneading method using, for example, a single-screw or twin-screw extruder. In order to efficiently disperse the incompatible first polymer into the polyolefin resin with high molecular weight, a relatively high shear force and a relatively high temperature are required. The chemical incompatibility of the first polymer with the polyolefin resin results in the first polymer being blended and dispersed in the polyolefin resin in a heterogenous distribution rather than a homogenous distribution, forming distinct rod-like domains oriented in MD.

The obtained resin composition can be used for producing a microporous membrane by a preferable dry method. A dry method includes a method of melt-kneading and extruding a polyolefin resin composition, and then forming a highly oriented film directly from a die, or a method of forming a highly oriented film by a circular die extrusion method to prepare a raw film, annealing the raw film, micropore opening by cold stretching, and delaminating the polyolefin lamellar crystal interface by hot stretching. According to the circular die extrusion method, for example, a melt-kneaded product of a polypropylene resin composition is blown up from a circular die to MD, and is taken up via a guide plate and a nip roll to obtain a highly crystallized and MD orientated raw film. A dry method may also use a nucleator or pore former to form pores, but no oil or solvent. An exemplary dry method of this type is a beta-nucleated biaxial stretching process. A wet method includes a method of melt-kneading a polyolefin resin composition and a pore-forming material such as an oil or solvent to prepare in sheet form followed by stretching if necessary, and extracting the pore-forming material from the sheet, a method of dissolving a polyolefin resin composition followed by immersing it in a poor solvent with respect to polyolefin to solidify polyolefin while removing the solvent at the same time, etc.

The polyolefin resin composition can contain, in addition to the incompatible first polymer and/or second polymer, a resin other than polyolefin, such as an additive, etc. Examples of additives include fluorine-based flow modifying materials, waxes, crystal nucleating materials, antioxidants, metal soaps such as aliphatic carboxylic acid metal salts, ultraviolet absorbers, light stabilizers, antistatic agents, anti-fogging agents, coloring pigments, etc. Melt-kneading of the polyolefin resin composition can be carried out by, for example, a kneader, a laboplast mill, a kneading roll, a Banbury mixer, etc., in addition to a single-screw or twin-screw extruder. Further, a direct compound method of directly molding a film after melt kneading the resin composition in an extruder can also be utilized. Examples of usable plasticizers include hydrocarbons such as liquid paraffin and paraffin wax; esters such as dioctyl phthalate and dibutyl phthalate; and higher alcohols such as oleyl alcohol and stearyl alcohol.

The pore forming step can be carried out in a known dry method or wet method. In a dry-stretch process like the Celgard® dry stretch process pores may be formed in a cold stretching step, and further opened in subsequent stretching steps. Alternatively, in a dry process using a nucleator or pore former, the pores may be formed via the nucleator or poreformer and further opened by stretching. In a wet process, pores may be formed when an oil or solvent is extracted. Stretching treatment can be carried out by uniaxial stretching or biaxial stretching, however, it is preferable to carry out at least MD stretching. When the membrane is being stretched in one direction, the other direction may be in a non-constrained state or in an anchored state with fixed length.

In order to suppress shrinkage of the microporous membrane, heat treatment can be carried out to produce heat setting, either after stretching or after pore formation. The heat treatment can include a stretching operation carried out with the prescribed temperature environment and the prescribed degree of stretching to adjust the physical properties, and/or relaxation operation carried out with the prescribed temperature environment and the prescribed degree of relaxation to reduce the stretching stress. The relaxation operation can also be carried out after the stretching operation. The heat treatment can be carried out using a tenter or roll stretcher. A method of producing a microporous membrane by a dry lamellar pore opening method will be described as an example. In the dry lamellar pore opening method, a nonporous precursor in which numerous lamellar structures are bonded via tie molecules, is stretched to cleave the lamellar interface and thereby form pores, without using a solvent such as water or an organic solvent.

A dry lamellar pore opening method can involve (i) a step of extruding a nonporous precursor (highly oriented raw film) formed from a resin composition containing polyolefin and a incompatible first polymer as desired, (iii) a step of annealing, and (iii) a step of uniaxial stretching the extruded nonporous precursor to form pores. Stretching may also be biaxial. The microporous film obtained by the dry lamellar pore-forming method and including steps (i), (ii), and (iii) can also be functionalized after the coating, dipping or impregnation step, etc.

Step (i) can be carried out by a conventional extrusion method (single screw, twin screw extrusion method). The extruder can be provided with a T-die or a circular die with elongated holes. The uniaxial stretching in step (iii) can be carried out in the manner described above. The longitudinal direction (MD) stretching can include both cold stretching and hot stretching. From the viewpoint of suppressing the internal distortion of the nonporous precursor, the nonporous precursor can be annealed during step (i), after step (iii), or prior to the stretching in step (iii). The annealing can be carried out in a range, for example, between a temperature lower by 50° C. than the melting point of the polypropylene resin (A) and a temperature lower by 1 ooc than the melting point of the polypropylene resin (A), or in a range between a temperature lower by 50° C. than the melting point of the polypropylene resin (A) and a temperature lower by 15° C. than the melting point of polypropylene resin (A).

Some embodiments described herein are further illustrated in the following non-limiting examples.

EXAMPLES

Figure 7:
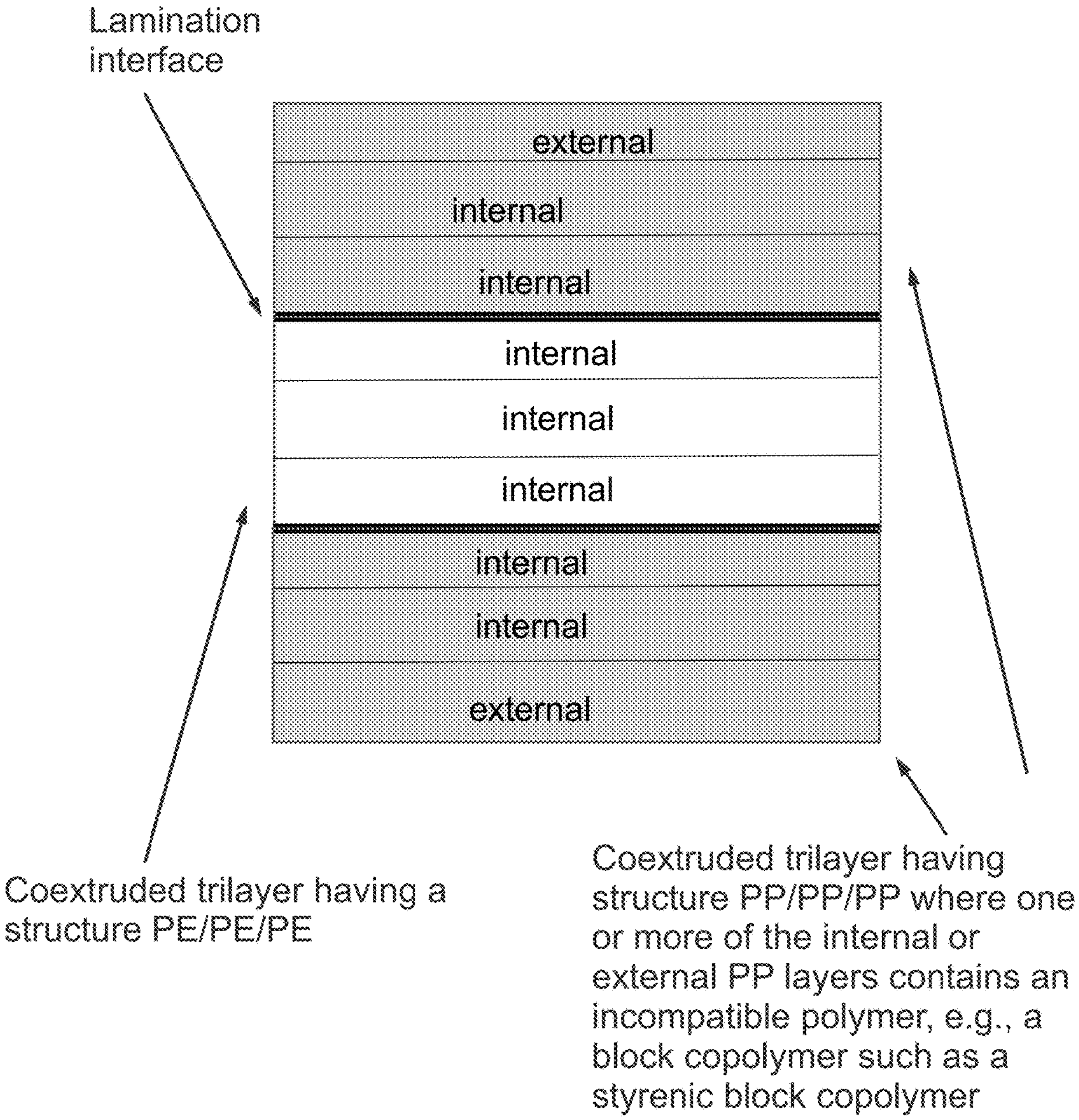
FIG. 7 is a schematic drawing of a membrane according to some embodiments described herein.

All microporous membranes unless otherwise specified were formed using the same dry-stretch process including at least extruding, annealing, and stretching steps. The lamination steps described below occur after extrusion, but prior to annealing. FIG. 7 shows a schematic drawing of membranes where a block copolymer such as a styrenic block copolymer is added in the PP layer, which is a coextruded trilayer in FIG. 7, but may be a coextruded bilayer or coextruded multilayer with four or more co-extruded layers.

The microporous membranes may be used as separators, textiles, filters, components of a material for personal protective equipment, or the like.

Preparation of Control Multilayer Microporous Membrane

A control multilayer microporous membrane (Control) having a structure of (PP1/PP1/PP1)/(PE1/PE1/PE1)/(PP1/PP1/PP1) was prepared by co-extruding PP1 to form a coextruded trilayer (PP1/PP1/PP1) and coextruding PE1 to form a coextruded trilayer, (PE1/PE1/PE1). Then two coextruded trilayers, (PP1/PP1/PP1), were laminated to a single coextruded trilayer (PE1/PE1/PE1) to form the structure (PP1/PP1/PP1)/(PE1/PE1/PE1)/(PP1/PP1/PP1). Each of the three sublayers in the two co-extruded trilayers, (PP1/PP1/PP1) comprised the same polypropylene composition. The three sublayers in the PE layer comprised the same polyethylene composition.

Preparation of Inventive Multilayer Microporous Membrane

An inventive multilayer microporous membrane (Comp 1) having a structure of (PP2/PP2/PP2)/(PE1/PE1/PE1)/(PP2/PP2/PP2) was prepared by co-extruding PP2 to form a coextruded trilayer (PP2/PP2/PP2) and coextruding PE1 to form a coextruded trilayer, (PE1/PE1/PE1). Then two coextruded trilayers, (PP2/PP2/PP2), were laminated to a single coextruded trilayer (PE1/PE1/PE1) to form the structure (PP2/PP2/PP2)/(PE1/PE1/PE1)/(PP2/PP2/PP2). Each of the three sublayers in the two co-extruded trilayers, (PP2/PP2/PP2) comprised the same polypropylene composition. PP2 is the same as PP1 except that 5% of the composition in PP1 has been replaced with a styrenic block copolymer that is incompatible with the composition of PP1. The three sublayers in the PE layer comprised the same polyethylene composition.

The Control and Comp 1 both formed using a dry-process including steps of extrusion (co-extrusion), laminating (of the co-extruded layers), annealing, and stretching. No oils or solvents were used.

The physical characteristics of the Control and Comp 1 membranes are shown in Table 1. As shown, puncture strength of the Comp 1 membrane increased nearly 20% over that of the control. Additionally, while pore size of the PE layers (PE1/PE1/PE1) were greater than those of the PP layers (PP1/PP1/PP1 or PP2/PP2/PP2) in the control, the Comp 1 membrane displayed a reduced size differential between the PE and PP layers and sublayers.

TABLE 1

| Physical Characteristics between Control(left column) and Comp 1(right column). | | |
|---|---|---|
| Thickness (μm) | 14 | 14.4 |
| Basis Weight (mg/cm$^2$) | 0.76 | 0.75 |
| JIS Gurley (s/100 cc) | 250 | 248 |
| 96 Shrinkage 105° C./1 h MD | 2.8 | 1.3 |
| MD Tensile (kgf/cm$^2$) | 2128 | 2248 |
| MD Elongation (96) | 51 | 39 |
| TD Tensile (kgf/cm$^2$) | 145 | 127 |
| TD Elongation (96) | 700 | 735 |
| Puncture Strength (gf) | 310-350 | 397 |
| DB Average (V) | 1950-2000 | 1989 |
| DB Min (V) | 1400-1600 | 1450 |
| Mix Penetration Average (N) | 650 | 735 |
| AQ Porosity (96) | 43 | 42.8 |
| AQ PP Pore Size (μm) | 0.033 | 0.041 |
| AQ PE Pore Size (μm) | 0.070 | 0.064 |
| AQ Surface Area (m$^2$/g) | 94 | 77.5 |
| Shutdown Temp (° C.) | 128 | 127.5 |

Example 2

Transmission Electron Microscopy the Microporous Membrane During Annealing

Transmission electron microscopy (TEM) images were obtained at each processing stage of Comp 1. FIG. 1 shows a TEM image of Comp 1 after co-extrusion of the (PP2/PP2/PP2) trilayer at a cross-section along the MD direction. As shown, the incompatible styrenic block copolymer domains segregate in the extruded film and orient towards MD, as evidenced by the dark rod-like domains extending towards MD.

Figure 2:
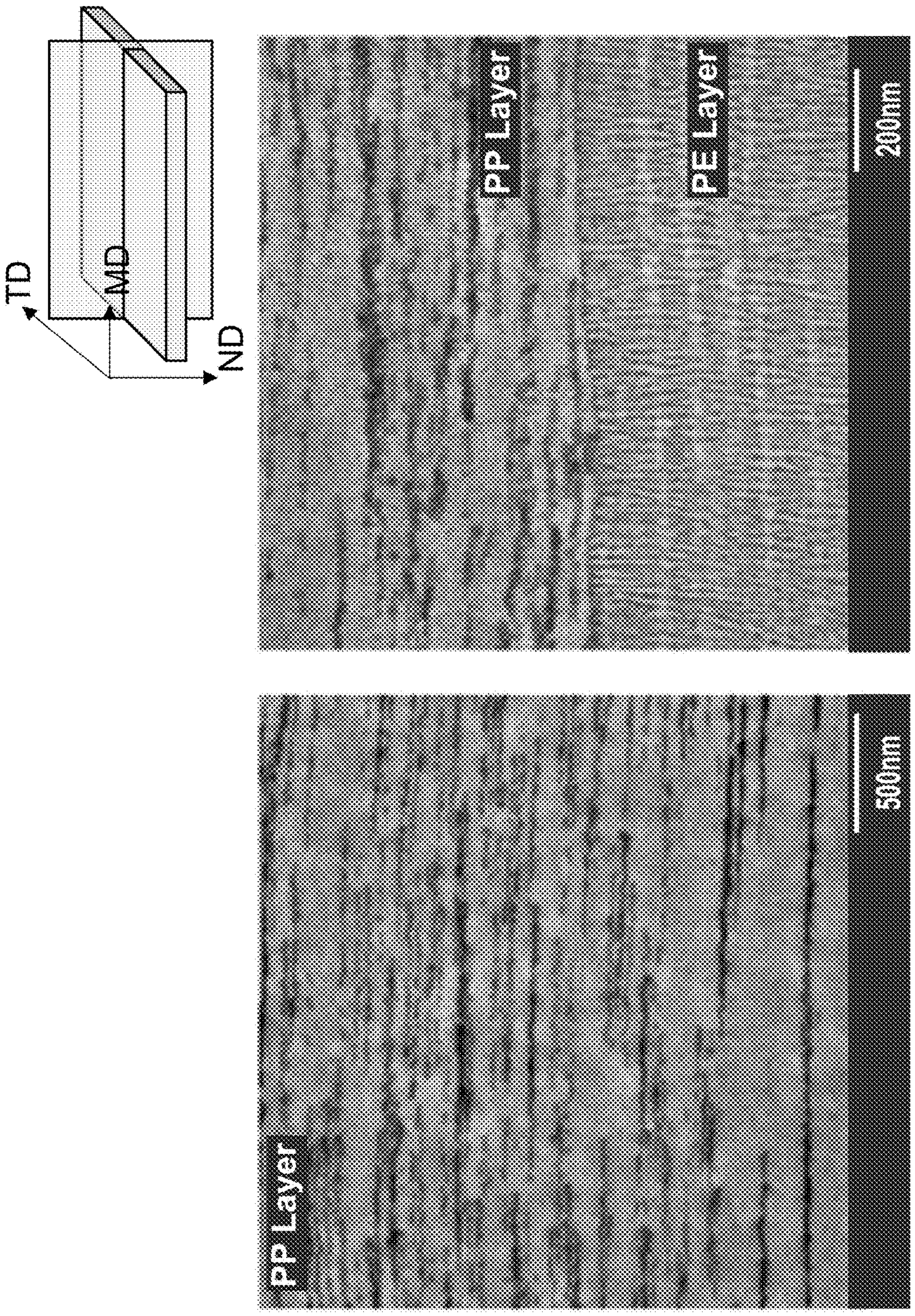
FIG. 2 is a TEM image of some embodiments described herein.

FIG. 2 shows the morphology of the Comp 1 after being annealed at 120° C. for 10 mins. As shown, the morphology of the styrenic block copolymer domains remain virtually unchanged in the PP layer.

Figure 3:
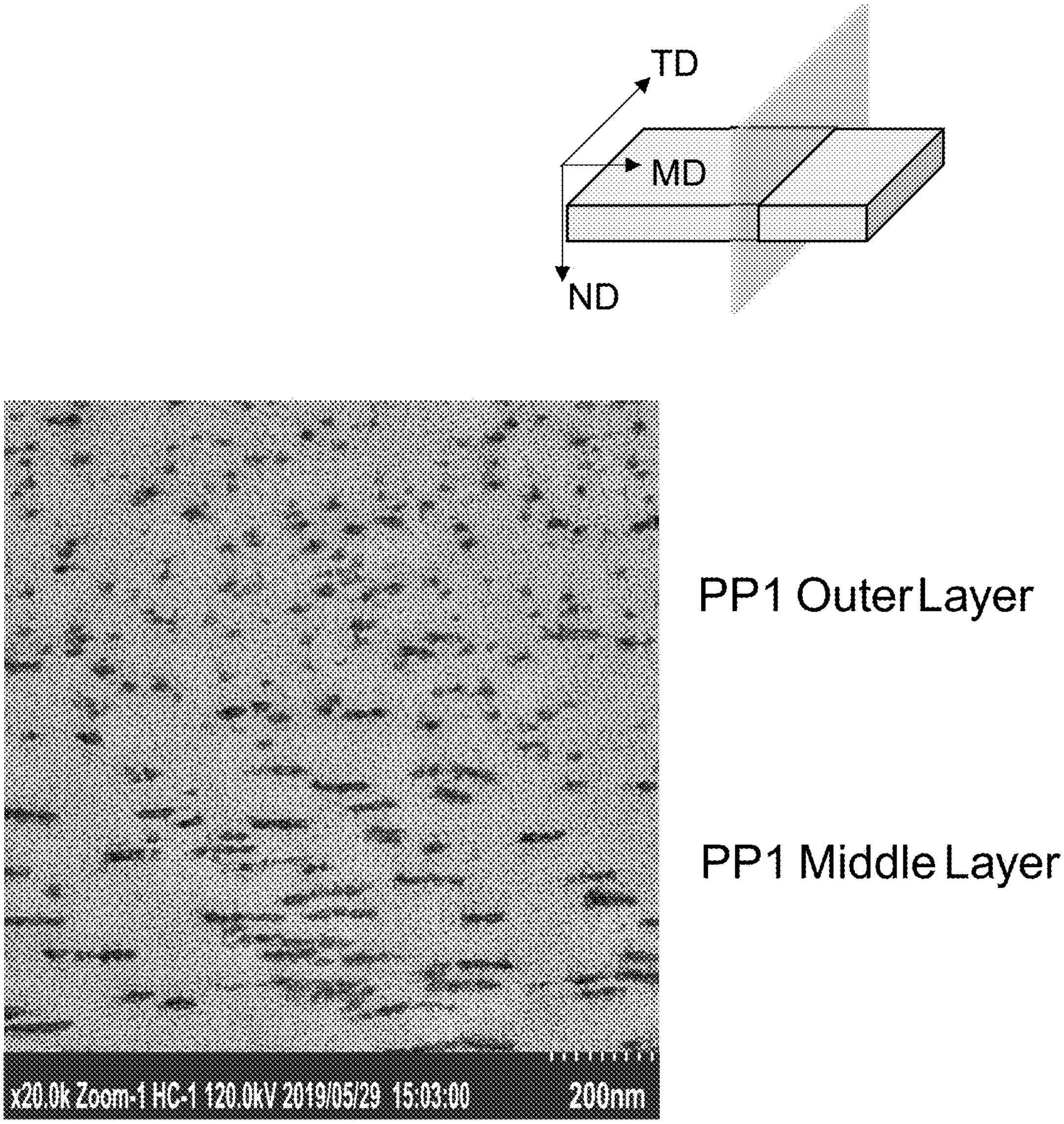
FIG. 3 is a TEM image of some embodiments described herein.
Figure 4:
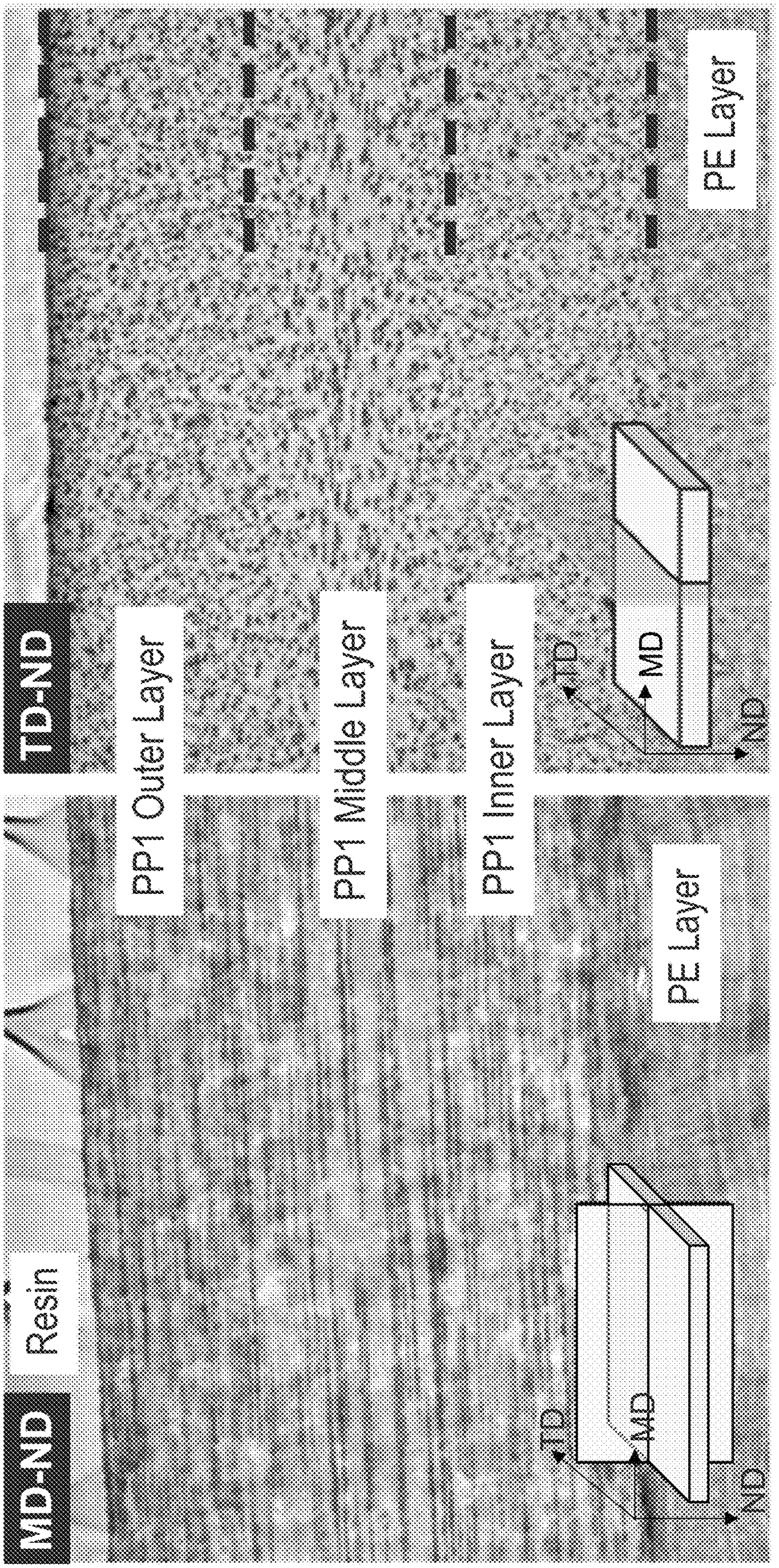
FIG. 4 is a TEM image of some embodiments described herein.

Each of the PP layers in Comp 1 are comprised of three coextruded sublayers, denoted as PP2 in the co-extruded trilayer PP2/PP2/PP2. Interestingly, the morphology of the styrenic block copolymer in each of the sublayers is different. As shown in the expanded view in FIG. 3 and the different cross-sectional views in FIG. 4, while the styrenic block copolymer in the outermost PP2 and the middle PP2 sublayers still form rod-like domains, styrenic block copolymer in the middle PP2 sublayer displays larger domains that are a collection of fused smaller domains after the annealing step.

Example 3

Transmission Electron Microscopy of Microporous Membrane During Stretching

Figure 5:
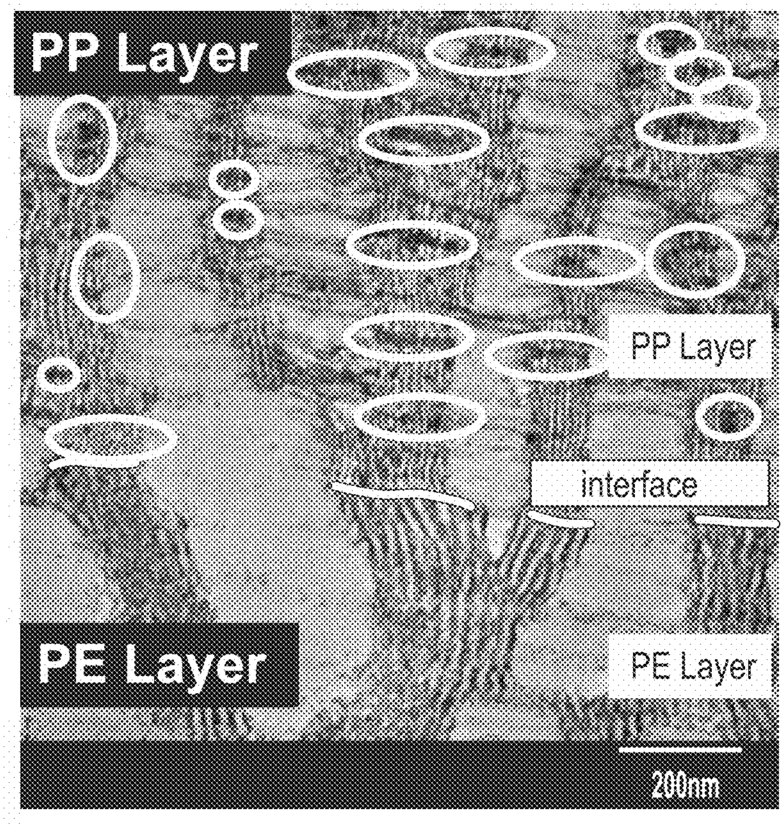
FIG. 5 is a TEM image of some embodiments described herein.

TEM images were acquired of cross-sections of the microporous membrane after stretching the annealed membrane in Example 2. As shown in FIG. 5, the rod-like styrenic block copolymer domains are only present in the PP lamella, but not in the areas between the lamellae.

Figure 6A:
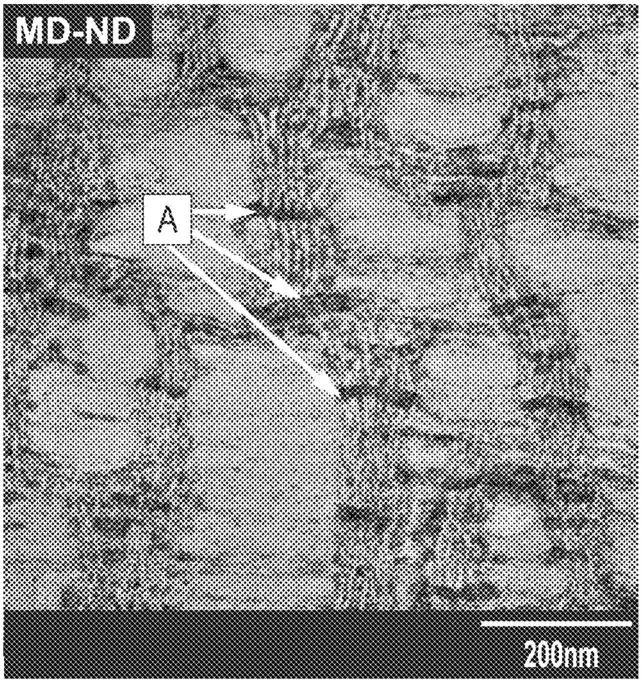
FIG. 6A shows a TEM image of some embodiments described herein.
Figure 6B:
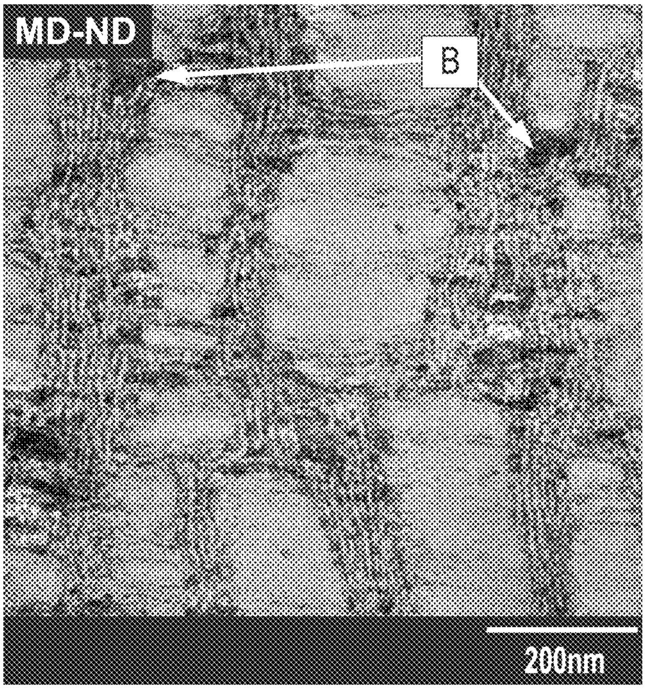
FIG. 6B shows a TEM image of some embodiments described herein.

FIG. 6A and FIG. 6B shows TEM images of this product in the PP layer. It is believed that the portions of broken styrenic block copolymer domains A and B on the lamella surface may contribute to the improve puncture strength by acting as shock absorbers when the membrane is compressed or stretched during a puncture event. During these events, the interlamellar space can be compressed in some instances, causing the crystalline PP lamellae to contact each other. In the absence of styrenic block copolymer, such contact could cause the crystalline PP lamellae to break, leading to failure of the membrane, i.e., puncture. The presence of styrenic block copolymer domains on the outer surface may absorb some of the force rather than the crystalline PP lamellae, preventing failure of the membrane.

Example 4

Microporous Membrane Variations

In a variation of Comp 1 described above, an embodiment (Comp 2) like Comp 1 was formed except that the PP layers had the compositions PP2/PP3/PP3 and the final structure had a composition (PP2/PP3/PP3)/(PE1/PE1/PE1)/(PP3/PP3/PP2). In this embodiment, PP2 and PE1 are as described above for Comp 1. PP3 is like PP2 except that 8% of PP3 was replaced with styrenic block copolymer.

In another variation of Comp 1 as described above, an embodiment (Comp 3) like Comp 1 was formed except that the PP layers had the compositions PP2/PP4/PP4 and the final structure had a composition (PP2/PP4/PP4)/(PE1/PE1/PE1)/(PP4/PP4/PP2). In this embodiment, PP2 and PE1 are as described above for Comp 1. PP4 is like PP2 except that 10% of PP4 was replaced with styrenic block copolymer.

In another variation of Comp 1 as described above, an embodiment (Comp 4) like Comp 1 was formed except that the PP layers had the compositions PP2/PP4/PP4 and the final structure had a composition (PP2/PP5/PP5)/(PE1/PE1/PE1)/(PP5/PP5/PP2). In this embodiment, PP2 and PE1 are as described above for Comp 1. PP5 is like PP2 except that 20% of PP5 was replaced with styrenic block copolymer.

In another variation, an embodiment (Comp 5) like Control was formed except the PE layer had the composition PE2/PE2/PE2 and the final structure had a composition (PP1/PP1/PP1)/(PE2/PE2/PE2)/(PP1/PP1/PP1). PP1 is as described above and PE2 is like PE1 except that 10% of the composition was replaced with styrenic block copolymer.

In another variation, a trilayer was formed having the structure PP1/PE2/PP1. The trilayer may be co-extruded (Comp 6) or laminated (Comp 7). PP1 and PE2 are as described herein.

In another variation, a trilayer PP2/PE1/PP2 was formed. The trilayer may be co-extruded (Comp 8) or laminated (Comp 9). PP2 and PE1 are as described herein.

In another variation an inverse trilayer, PE1/PP3/PE1. The trilayer may be co-extruded (Comp 10) or laminated (Comp 11). PE1 and PP3 are as described herein.

In another variation an inverse trilayer, PE2/PP1/PE2. The trilayer may be co-extruded (Comp 12) or laminated (Comp 13). PE2 and PP1 are as described herein.

In another variation, a multilayer structure (PP1/PP2/PP2)/(PE2/PE2/PE2)/(PP2/PP2/PP1) was formed. Two coextruded trilayer (PP1/PP2/PP2) films were laminated with one laminated trilayer (PE2/PE2/PE2) film to form the structure.

In another variation, a structure PP1/PP2/PE2/PE2/PP2/PP1 was formed using a bubble extrusion of PP1/PP2/PE2. The bubble was collapsed on itself in what is called a "collapsed bubble" process and a bond is formed between the two internal PE2 layers of the bubble.

In any of the above examples where a styrenic block copolymer is used in an internal layer, the styrenic block copolymer may be replace with ethylene-butene copolymer or the like. Ethylene-butene may also replace the styrenic block copolymer in PE-containing layers.

The invention claimed is:

1. A multilayer porous membrane comprising at least one internal layer that comprises a first polymer blend composition comprising a first polyolefin thermoplastic resin and a first block copolymer that is incompatible with the first polyolefin thermoplastic resin, wherein the first block copolymer comprises a styrenic block copolymer or an ethylene-butene block copolymer and is present in the first polymer blend composition in an amount of between 1 wt. % and 20 wt %; and at least one layer adjacent to the at least one internal layer, wherein the at least one adjacent layer comprises a second polyolefin thermoplastic resin, wherein the first polyolefin thermoplastic resin and the second polyolefin thermoplastic resin each independently comprises a polypropylene, a polyethylene, mixtures thereof, copolymers thereof, or terpolymers thereof, and wherein the second polyolefin thermoplastic resin is the same as or different than the first thermoplastic resin;

wherein the membrane has a puncture strength of 350 gf or more when normalized for thickness at 14 microns.

2. The multilayer porous membrane of claim 1, wherein the first polyolefin thermoplastic resin and the second polyolefin thermoplastic resin are the same.

3. The multilayer porous membrane of claim 1, wherein the block copolymer is a styrenic block copolymer.

4. The multilayer porous membrane of claim 3, wherein the block copolymer is a styrene-ethylene-butylene-styrene (SEBS), a styrene-ethylene-propylene-styrene (SEPS) block copolymer, a styrene-ethylene-ethylene-propylene-styrene (SEEPS) block co-polymer, or a styrene-ethylene-propylene (SEP) block co-polymer.

5. The multilayer porous membrane of claim 1, wherein the at least one adjacent layer is an internal layer and does not contain a block copolymer incompatible with the second polyolefin thermoplastic resin.

6. The multilayer porous membrane of claim 1, wherein the internal layer has a thickness from 0.1 to 10 microns.

7. The multilayer porous membrane of claim 1, wherein the at least one adjacent layer is an internal layer and contains a second block copolymer incompatible with the second polyolefin thermoplastic resin, the second block copolymer comprising a styrenic block copolymer or an ethylene-butene block copolymer, and being the same or different from the first block copolymer.

8. The multilayer porous membrane of claim 1, wherein the first polymer blend composition comprises the first block copolymer in an amount of 8 wt. %.

9. The multilayer porous membrane of claim 1, wherein the first polymer blend composition comprises the first block copolymer in an amount of 5 wt. %.

10. The multilayer porous membrane of claim 1, wherein the first polymer blend composition comprises the first block copolymer in an amount of 10 wt. %.

11. The multilayer porous membrane of claim 1, wherein the glass transition temperature ($T_g$) of the first block copolymer is lower than that of the polyolefin thermoplastic resin.

12. The multilayer porous membrane of claim 1, wherein the porous membrane is formed by a dry-process.

13. The multilayer porous membrane of claim 1, wherein the at least one adjacent layer is an external layer and does not contain a block copolymer incompatible with the second polyolefin thermoplastic resin.

14. The multilayer porous membrane of claim 1, wherein the membrane is free of a compatibilizer that compatibilizers the polyolefin thermoplastic resin and the first block copolymer.

15. The multilayer porous membrane of claim 1, wherein the at least one adjacent layer is an external layer and contains a second block copolymer incompatible with the second polyolefin thermoplastic resin, wherein the second block copolymer comprises a styrenic block copolymer or an ethylene-butene block copolymer, and wherein the second block copolymer is the same or different from the first block copolymer.

16. The multilayer porous membrane of claim 15, wherein an amount of the second block copolymer in the external layer is less than an amount of the first block copolymer in the internal layer.

17. The multilayer porous membrane of claim 16, wherein the external layer comprises less than 10 wt. % of the second block copolymer.

18. A battery separator comprising the multilayer porous membrane of claim 1.

19. A secondary battery comprising the battery separator of claim 18.

20. A porous membrane comprising at least one first internal layer that contains a first polymer blend composition comprising a polyethylene and optionally a polymer that is incompatible with polyethylene;

at least one second layer comprising a second polymer blend composition that contains polypropylene and an incompatible polymer in an amount of between 1 wt. % and 20 wt %, wherein the incompatible polymer is a styrene-ethylene-butylene-styrene (SEBS), a styrene-ethylene-propylene-styrene (SEPS) block copolymer, a styrene-ethylene-ethylene-propylene-styrene (SEEPS) block co-polymer, or a styrene-ethylene-propylene (SEP) block co-polymer.

21. The porous membrane of claim 20, further comprising at least one third layer comprising a third polymer blend composition that contains polypropylene and optionally a polymer that is incompatible with polypropylene.

22. The porous membrane of claim 21, wherein the second layer is an internal layer and the amount of incompatible polymer in the second polymer blend composition is between 5 wt. % and 20 wt. %.

23. The porous membrane of claim 21, wherein the third layer is an external layer and the amount of incompatible polymer in the third polymer blend composition is less than 5 wt. %.

24. The porous membrane of claim 21, wherein the porous membrane is a trilayer or multilayer membrane.

25. A battery separator comprising the porous membrane of claim 21.

26. A secondary battery comprising the battery separator of claim 25.

27. A textile, filter, or material for personal protective equipment comprising the porous membrane of claim 1.

28. A textile, filter, or material for personal protective equipment comprising the porous membrane of claim 21.

* * * * *